US010223121B2

(12) United States Patent
Ouziel et al.

(10) Patent No.: US 10,223,121 B2
(45) Date of Patent: Mar. 5, 2019

(54) METHOD AND APPARATUS FOR SUPPORTING QUASI-POSTED LOADS

(71) Applicant: Intel Corporation, Santa Clara, CA (US)

(72) Inventors: Ido Ouziel, Ein Carmel (IL); Raanan Sade, Kibutz Sarid (IL); Jacob Doweck, Haifa (IL)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 15/388,744

(22) Filed: Dec. 22, 2016

(65) Prior Publication Data

US 2018/0181393 A1 Jun. 28, 2018

(51) Int. Cl.
| G06F 9/312 | (2018.01) |
| G06F 9/48 | (2006.01) |
| G06F 9/30 | (2018.01) |
| G06F 9/38 | (2018.01) |

(52) U.S. Cl.
CPC ........ *G06F 9/3016* (2013.01); *G06F 9/30043* (2013.01); *G06F 9/30189* (2013.01); *G06F 9/383* (2013.01); *G06F 9/3855* (2013.01); *G06F 9/3857* (2013.01); *G06F 9/485* (2013.01); *G06F 9/4837* (2013.01); *G06F 9/4887* (2013.01)

(58) Field of Classification Search
CPC ............... G06F 9/3016; G06F 9/30167; G06F 9/30185; G06F 9/30189; G06F 9/3802; G06F 9/383; G06F 9/3832; G06F 9/3855; G06F 9/3857; G06F 9/3004; G06F 9/30043; G06F 9/485; G06F 9/5038; G06F 9/4837; G06F 9/4881; G06F 9/4887
USPC ................. 712/208, 213, 216–219, 245, 248
See application file for complete search history.

(56) References Cited

U.S. PATENT DOCUMENTS

| 6,078,976 A * | 6/2000 | Obayashi ................ G06F 13/28 710/113 |
| 6,412,030 B1 * | 6/2002 | Adusumilli ......... G06F 13/1621 710/2 |
| 7,788,473 B1 * | 8/2010 | Nelson .................... G06F 9/383 712/219 |
| 2008/0010420 A1 * | 1/2008 | Kao ..................... G06F 12/0223 711/154 |

(Continued)

OTHER PUBLICATIONS

Intel Corporation, "IA-32 Intel® Architecture Software Developer's Manual—vol. 2: Instruction Set Reference", 978 pages, 2003.

*Primary Examiner* — Daniel H Pan
(74) *Attorney, Agent, or Firm* — Alliance IP, LLC

(57) ABSTRACT

A processor includes a decoder, a data return buffer, and an execution unit. The decoder is to decode an instruction for a non-posted load into a decoded instruction for loading data from memory mapped input/output. The execution unit is for executing the decoded instruction. The execution is to start a timer, determine whether the timer exceeds a timeout threshold, allocate an entry in the data return buffer for the load, and determine whether an event arrived. The timer is to measure an amount of time taken to return the non-posted load instruction. The determination whether an event arrived is made in response to at least one of the allocation of the entry for the load, or a determination that the timer exceeds the timeout threshold.

20 Claims, 17 Drawing Sheets

(56) References Cited

U.S. PATENT DOCUMENTS

2013/0339595 A1* 12/2013 Kumar .................... G06F 13/14
711/105

* cited by examiner

METHOD AND APPARATUS FOR SUPPORTING QUASI-POSTED LOADS

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native, or more native, for execution on the processor. Processors may be implemented in a system on chip.

Many multiprocessor systems provide for a type of interrupt called an interprocessor interrupt (IPI). An IPI is typically a request for action from a sending processor to a receiving processor. In some systems, the sending processor writes to an interrupt command register or a software interrupt register to initiate the IPI between the sending processor and the receiving processor.

DESCRIPTION OF THE FIGURES

Embodiments are illustrated by way of example and not limitation in the Figures of the accompanying drawings.

DETAILED DESCRIPTION

Figure 1A:
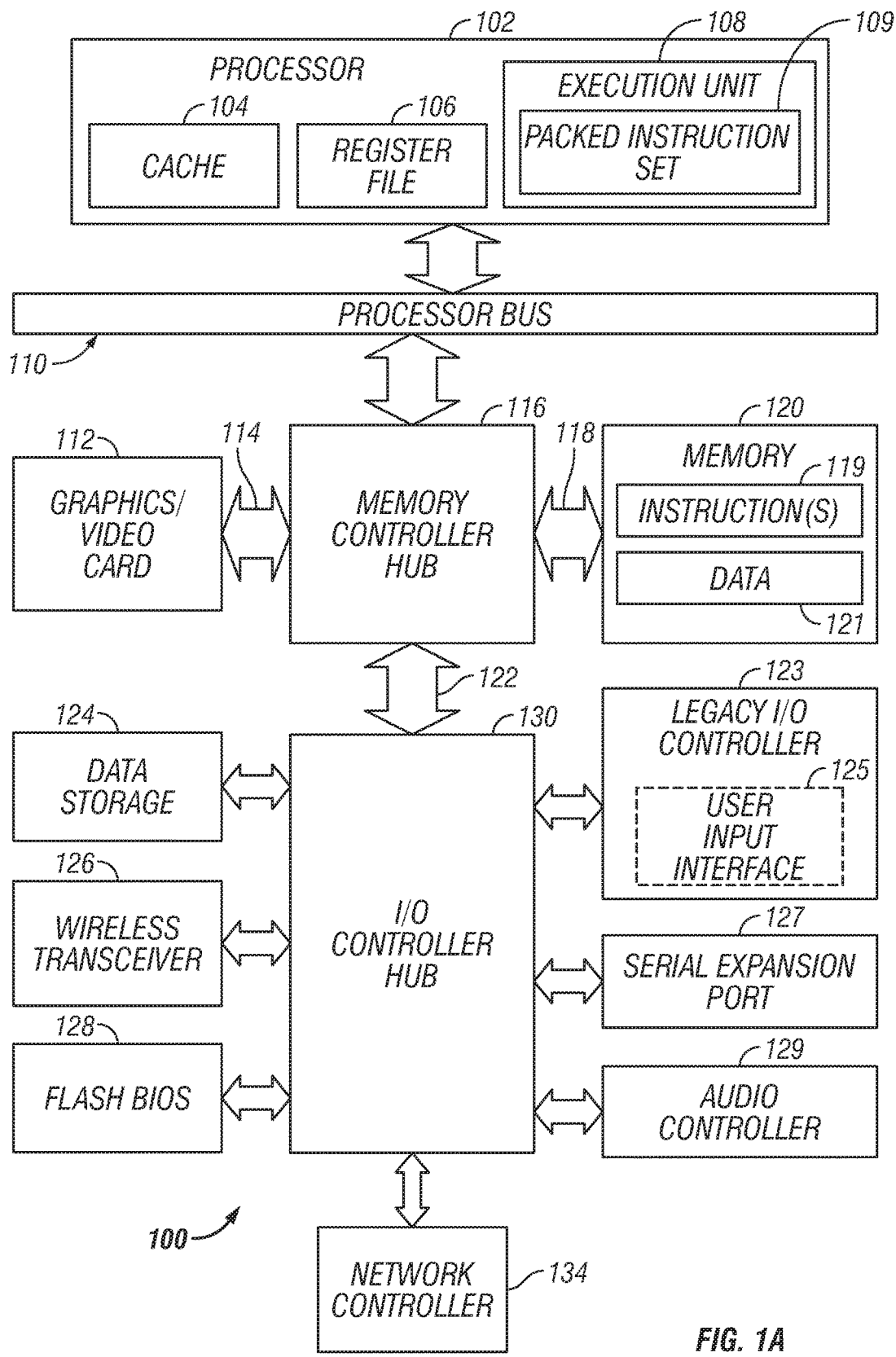
FIG. 1A is a block diagram of an exemplary computer system formed with a processor that may include execution units to execute an instruction, in accordance with embodiments of the present disclosure.

The following description describes an instruction and processing logic for supporting quasi-posted loads. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the operations of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, operations of embodiments of the present disclosure might be performed by specific hardware components that contain fixed-function logic for performing the operations, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and/or output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM® microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
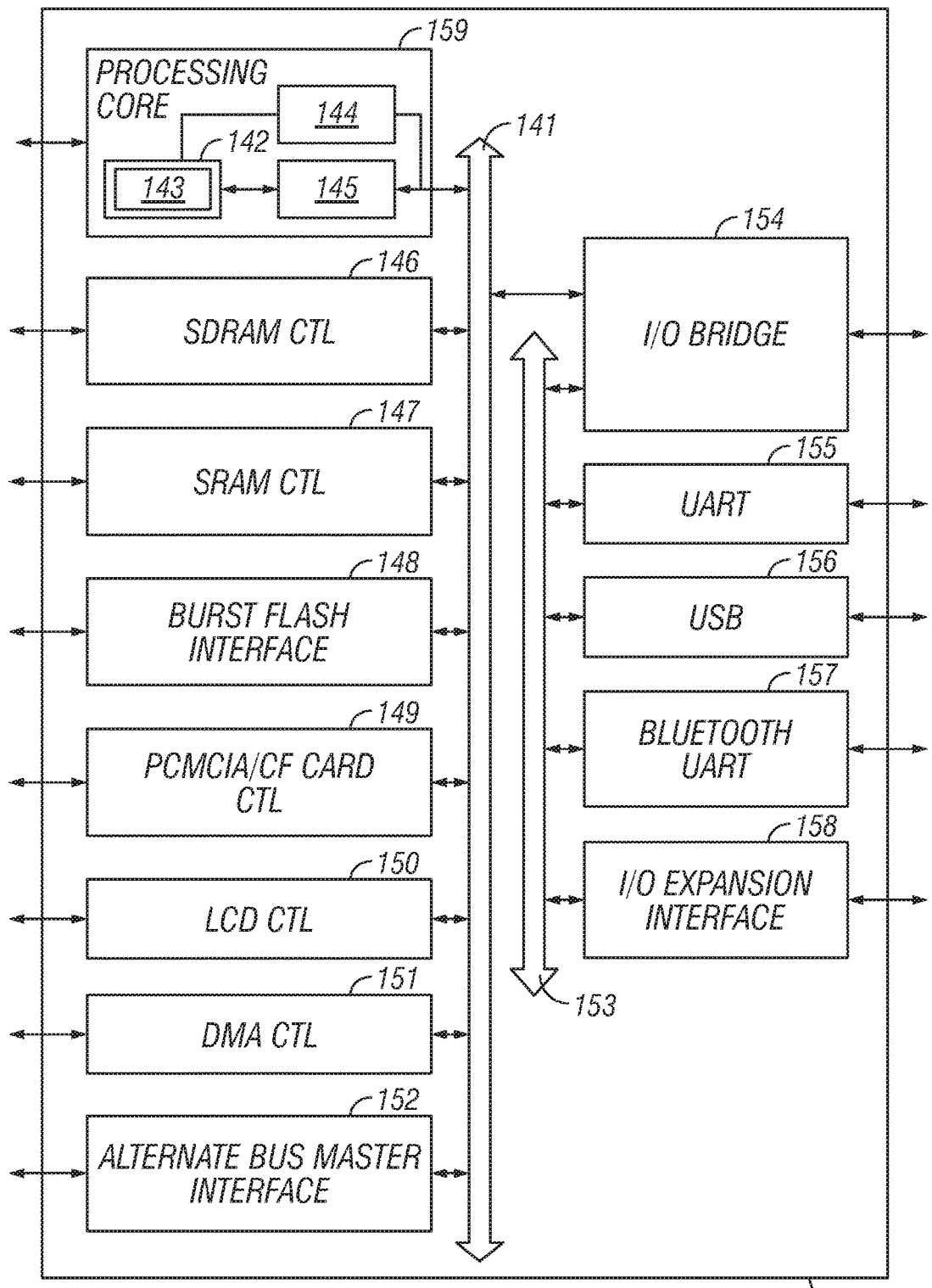
FIG. 1B is a block diagram illustrating a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
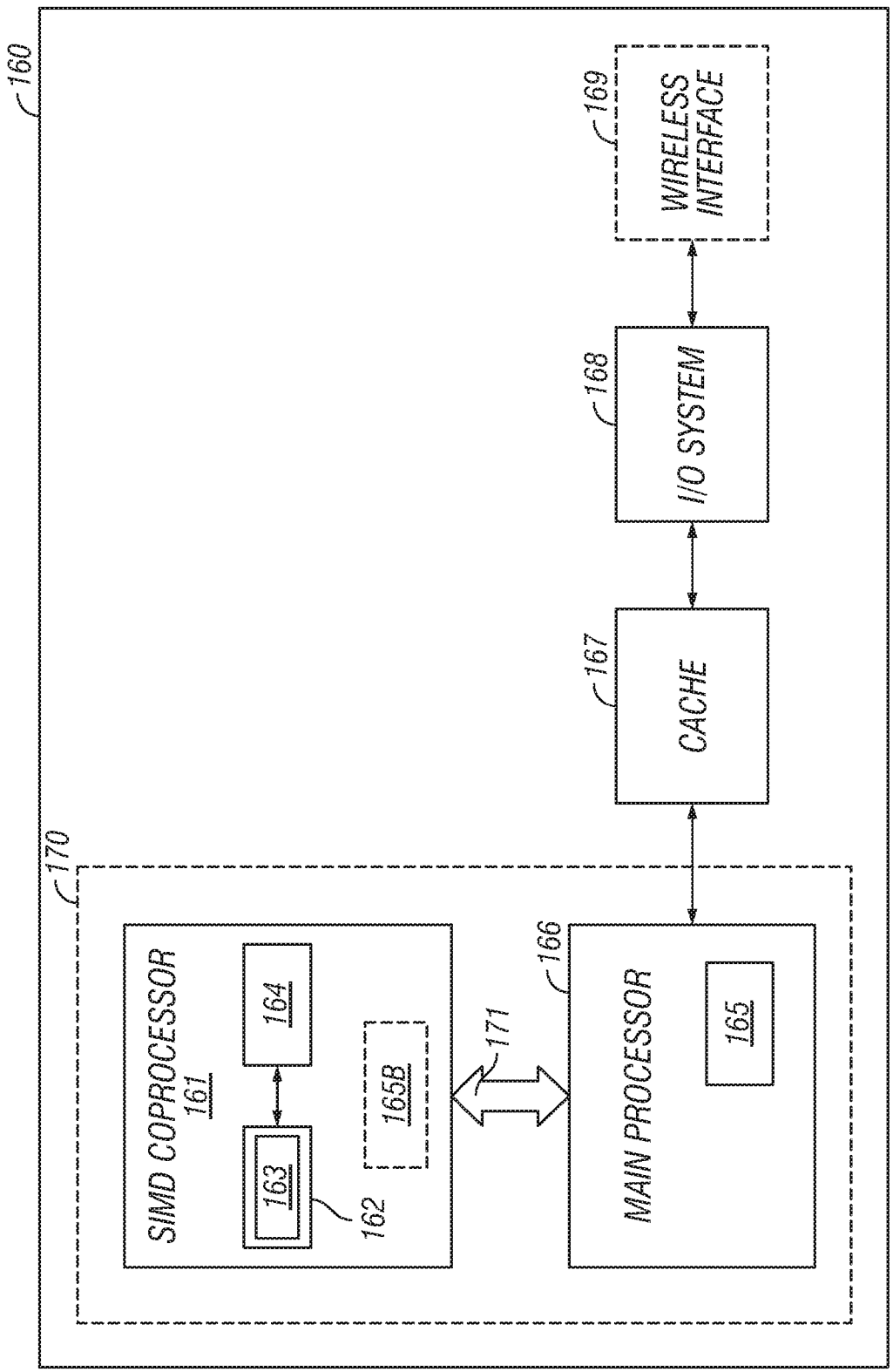
FIG. 1C is a block diagram illustrating other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
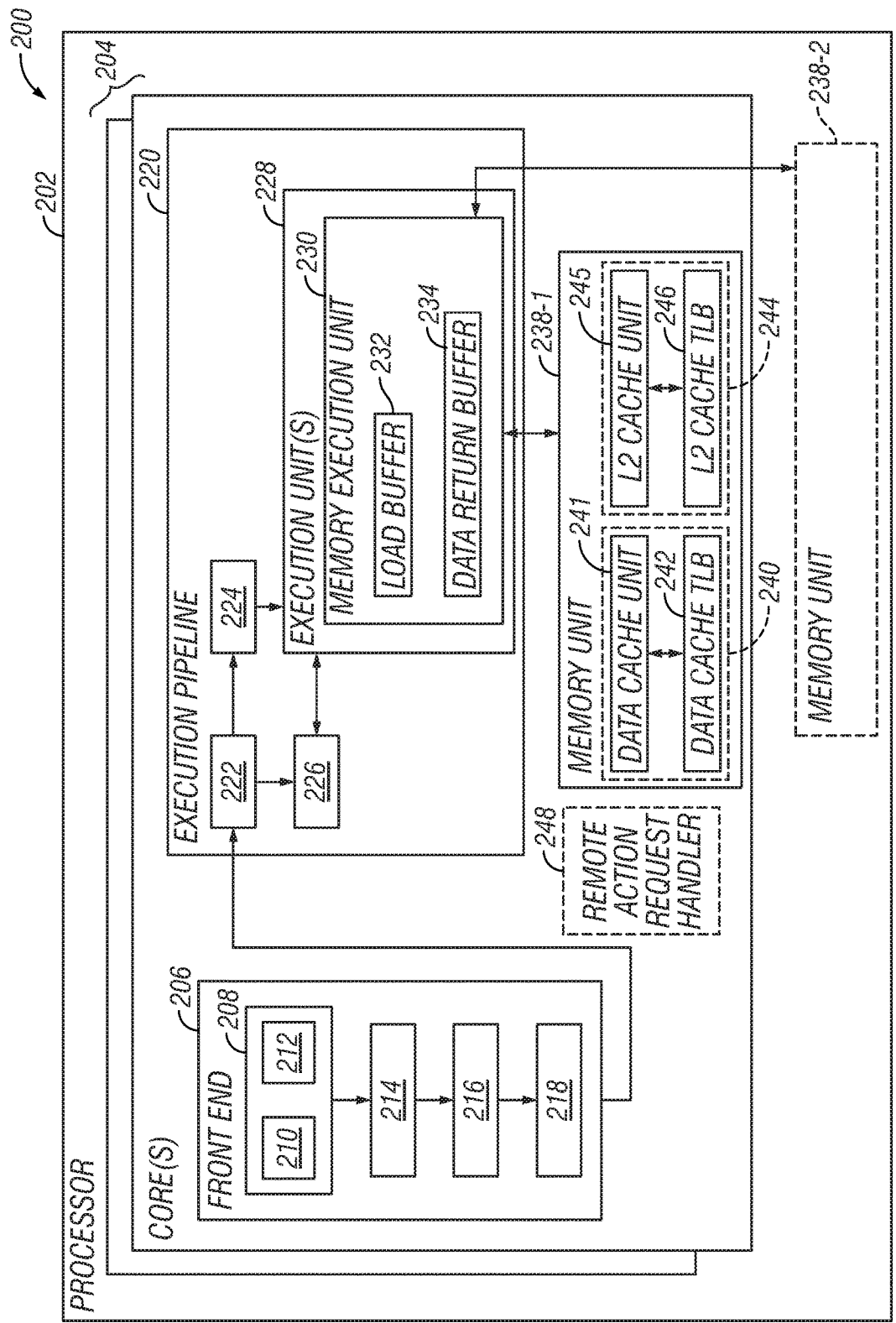
FIG. 2 is a block diagram illustrating an example system for supporting quasi-posted loads, in accordance with embodiments of the present disclosure.

Embodiments of the present disclosure involve methods and systems for supporting quasi-posted loads. FIG. 2 is an illustration of a system 200 for supporting quasi-posted loads, in accordance with embodiments of the present disclosure. System 200 may include any suitable number and kind of elements to perform the operations described herein, including a processor, SoC, integrated circuit, or other mechanism. Furthermore, although specific elements of system 200 may be described herein as performing a specific function, any suitable portion of system 200 may perform the functionality described herein. For example, system 200 may include processor 202. Although processor 202 is shown and described as an example in FIG. 2, any suitable mechanism may be used. Processor 202 may include any suitable mechanism for supporting quasi-posted loads. In at least one embodiment, such mechanisms may be implemented in hardware. Processor 202 may be implemented fully or in part by the elements described in FIGS. 1-14.

In one embodiment, system 200 may include a memory execution unit 230 for supporting quasi-posted loads. System 200 may include memory execution unit 230 in any suitable portion of system 202. In one embodiment, memory execution unit 230 may be implemented as part of an execution unit, which may be within one or more execution units 228 and an execution pipeline 220 of core 204. In another embodiment, memory execution unit 230 may be implemented within one or more intellectual property (IP) cores (not shown), which may be separate from one or more main cores 204 of processor 202. Memory execution unit 230 may be implemented by any suitable combination of circuitry or hardware computational logic of a processor.

A processor may perform the functions of loading data, operating on the data loaded, and storing the results of the operation. Data may be loaded in many ways from a variety of sources. Load instructions, which may be included in other instructions, such as an ADD instruction, may retrieve data from a source. Load instructions may be categorized by how the data is stored once it is retrieved. Data retrieved from cacheable loads may be stored in one or more caches within a processor. Data retrieved from uncacheable loads might not be stored in a cache of a processor. Load instructions may also be categorized by the type of operation performed. Some load instructions may retrieve data from a register, a cache, or a memory. Some other load instructions, for example, may retrieve data from a device, which may be mapped in memory. This type of mapping may be referred to as memory mapped I/O (MMIO). The device, for example, may include a Peripheral Component Interconnect Express (PCI-E) bus to communicate with a processor. The PCI-E bus may enable two types of MMIO loads: posted and non-posted transaction. The term posted transaction may refer to situations in which the requestor does not receive an a response to a transaction. The term non-posted transaction may refer to situations in which the requestor may expect to receive a response to the transaction. The response may be received by the requestor at a later time. The time between a request and the response for non-posted MMIO loads may be referred to as the MMIO latency. An example of a non-posted transaction may be a load instruction, or an I/O read operation.

The latency of a processor may be defined by the amount of time for one cycle of operation. In comparison to the latency of a processor, the MMIO latency may be very large. For example, the latency of a processor, which may be operating at 3 GHz, may be 0.33 nanoseconds, and the MMIO latency for a given MMIO load operation may be several microseconds. Moreover, in comparison to the speed of operation for a typical memory read, the MMIO latency may be large. For example, a typical memory read latency may be 15 nanoseconds, and a MMIO latency for a given MMIO load operation may be several microseconds. During a non-posted read instruction, the processor may wait for the MMIO load operation to complete and may not be able to be interrupted by any internal or external event until the non-posted read instruction retires. This may result in a loss of quality of service due to the processor being unable to handle an interruption by an event until after the non-posted read instruction completes execution.

Some processors or systems on a chip (SoCs) include a plurality of cores or logical processors. To ensure that the plurality of logical processors operate properly, some protocols may require all cores to acknowledge an event that may be generated from one of the cores. If a core is executing a non-posted load operation, the core may not respond to the event until after the non-posted load operation completes execution. As noted above, the non-posted load operation may require several microseconds to complete, or tens of thousands of processor clock cycles. A core executing a non-posted load operation, therefore, may not be able to respond to the event for tens of thousands of processor clock cycles.

A processor, or software using a processor, may dedicate a thread or core for performing MMIO load operations. However, dedicating a thread or core might decrease system performance, and software might not be able to receive a response from the core dedicated to MMIO load operations. Accordingly, a processor for supporting quasi-posted loads may be used to improve the responsiveness and maintain the performance of the system. A quasi-posted load, also known as a timeout load, may represent a non-posted load instruction that exceeds a specified threshold. In at least some embodiments, a processor may be able to respond to external or internal events while executing a quasi-posted load.

For the processing of an instruction, the front end 206 of a core 204 of processor 200 may fetch an instruction using an instruction fetcher 214 from an instruction cache 208, which may include an instruction cache unit (ICU) 210 and an instruction translation lookaside buffer (TLB) unit 212. A TLB may be used to reduce the latency to access ICU 210 by storing translations of virtual memory addresses to physical memory addresses. The instruction fetcher 214 may fill the processing pipeline efficiently with possible instructions to execute. Front end 206 may also include an instruction decoder 216 to decode an instruction into opcodes for execution, which may determine the meaning, side effects, data required, data consumed, and data to be produced for the instruction. In some embodiments, a binary translator 218 may be used to optimize or improve the efficiency of code prior to its execution.

The decoded instruction may be passed to an out-of-order or in-order execution unit in an execution pipeline 220. Execution pipeline 220 may include a rename and allocate unit 222 for renaming instructions for out-of-order execution, and a reorder buffer (ROB) coextensive with a retirement unit 226 so that instructions may appear to be retired in the order that they were received. Rename and allocate unit 222 may further rename or allocate resources for execution of multiple instructions in parallel. Scheduler 224 may schedule or allocate instructions to execute on execution units 228 when inputs are available. Outputs of execution units 228 may queue in the ROB 226. Front end 206 may attempt to anticipate any behaviors that will prevent instructions from executing in a sequential stream and may fetch streams of instructions that might execute. When there is, for example, a misprediction of a branch, the ROB 226 may inform the front end 206 and a different set of instructions might be executed instead. Front end 206 may store data such as metadata for branch prediction for front end 206 to anticipate or predict future branches. The instructions may be retired as if they were executed in program order. Various portions of such execution pipelining may be performed by one or more cores 204. Each core 204 may include one or more threads or logical cores for execution.

Execution units 228 may include a memory execution unit (MEU) 230, which may include a load buffer 232 for storing load operations, a data return buffer (DRB) 234 for storing and supporting quasi-posted load operations. In some embodiments, load buffer 232 may be a data fill buffer, which may include DRB 234.

The execution pipeline may send and receive data from one or more memory units 238. In at least one embodiment, memory unit 238-1 may include a data cache (not shown), which may include data cache unit (DCU) 240, which may include a data cache 241 for buffering data to be used or data recently used by execution pipeline 220 and a data cache TLB 242 for storing recent translations between virtual and physical memory. Memory unit 238-1 may also include a level two cache (not shown), which may include level two cache unit (L2 cache unit) 244, which may include a level two cache 245 for caching data and/or instructions and a level two cache TLB 246 for caching recent translations between virtual and physical memory. In some embodiments, processor 202 may include memory unit 238-2, which may include any portion of memory unit 238-1, such as an L2 cache unit 244 shared between one or more cores.

One or more entries in one or more TLBs in processor 202 may be cleared or invalidated by remote action request handler (RARH) 248, which may respond to remote action requests (RAR) from other cores. In some embodiments, TLBs 212, 242, and 246 are separate physical circuits. In other embodiments, a single physical TLB circuit may be logically partitioned amongst the TLBs and/or processors. RARH 248 may interrupt a normal execution flow of operations in the processor and may not raise an interrupt to be handled by software. A system processing an RAR may require all cores or logical processors to respond to the request or event before completion. A response may not be timely if the responsiveness of system 200 is affected by the delay in response to an RAR. A core that is processing a non-posted load may use MEU 230 to support quasi-posted loads in order to allow RARH 248 to respond to an RAR in a timely manner.

MEU 230 with support for quasi-posted loads may enable the processing of an RAR request by RARH 248 by allocating an entry in DRB 234 for a non-posted load, which may correspond to an MMIO load operation. To enable processing of an RAR, for example, MEU 230 may include a timeout threshold in any suitable manner. For example, MEU 230 or processor 202 may include a configuration register that includes a field whose contents specify the timeout threshold for non-posted loads. In some embodiments, some cores 204 may have different timeout thresholds than other cores 204.

If and when a non-posted load timer (not shown) exceeds the timeout threshold, an entry in a buffer may be allocated for a non-posted load, or an entry previously allocated in a buffer may be locked for a non-posted load. In one embodiment, the timer may be initialized to the timeout threshold and may be decremented over time. If the timer does not reach zero, the non-posted load may be ready for retirement. If the timer reaches zero, the non-posted load may have exceeded a specified duration, and an entry in DRB 234 may be allocated. In another embodiment, the timer may be initialized to a known value, such as zero, and may increment over time. If the timer does not reach the timeout threshold, the non-posted load may be ready for retirement. However, if the timer reaches the timeout threshold, the non-posted load may have exceeded the duration specified by the timeout threshold and an entry in DRB 234 may be allocated.

If and when the timer exceeds the timeout threshold, processor 202 may respond to an internal or external event. In some embodiments, processor 202 may only process one or a predefined set of events that do not modify the architectural state, change the instruction order, or perform any operation dependent on the data to be retrieved by the non-posted load while the non-posted load operation is being processed. The predefined set of events may include, but are not limited to an RAR, a request to invalidate a cache line, a request to read the state of the core or processor, such as the temperature or current configuration. Although RARH 248 is shown, any suitable event handler may receive an event to be handled by the processor, such as an event handler to process requests to invalidate cache lines or an event handler to process requests to read the state of the core or processor. After handling an event, such as an RAR by RARH 248, processor 202 may restart the non-posted load without triggering another externally visible load operation. In this case, other cores or memory outside of the core may not be aware that the load operation restarted. The restart of the load operation may include storing the current counter value as a baseline, or resetting the counter value to a known or predefined value, such as zero. In some embodiments, on restart memory execution unit 230 may redirect the non-posted load operation to the corresponding entry in DRB 234 to enable DRB 234 to operate as a write back buffer for the load operation. The entry in DRB 234 may include, or be associated with, a valid field. The contents of the valid field may specify whether the data requested by the load operation has been retrieved and/or returned.

If the timer exceeds the timeout threshold a second time and the valid field is not set, an entry for the non-posted load may again be allocated in DRB 234, or the allocated entry in DRB 234 may be locked. Processor 202 may then process another event. If processor 202 or core 204 have not received an internal or external event, memory execution unit 230 may restart operation again until a third timeout occurs. Timeouts may occur repeatedly until either the data requested by the load operation has been retrieved, or a system agent or an uncore unit of processor 202 signals to core 204 that the load operation has timed out with an error. In some embodiments, the error may result in core 204 receiving blank and/or invalid data in response to the request for data.

Although various operations are described in this disclosure as being performed by specific components of processor 202, this functionality may be performed by any suitable portion of processor 202, in other embodiments.

Figure 3:
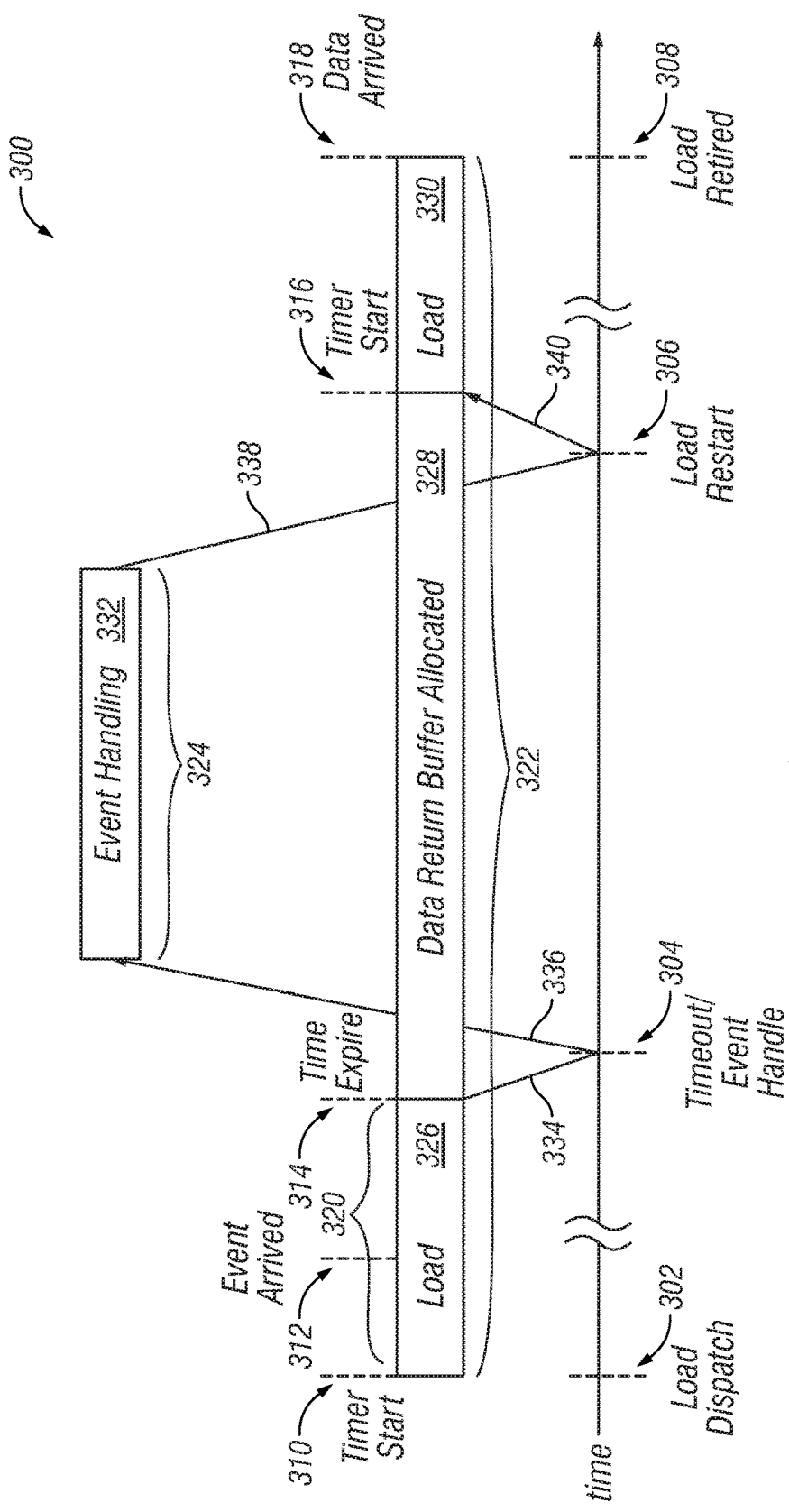
FIG. 3 is a timing diagram illustrating an overview of the operation of a system for quasi-posted loads, in accordance with embodiments of the present disclosure.

FIG. 3 is a timing diagram 300 that illustrates an overview of the operation of a system for quasi-posted loads, in accordance with embodiments of the present disclosure. The horizontal x-axis of FIG. 3 may represent time. At time 302, a non-posted load instruction 326 may be dispatched. At dispatch or shortly thereafter at time 310, a timer may begin to count the amount of time taken by the non-posted load instruction to complete execution. Completion of execution may be represented by the arrival of the data requested by the load instruction, or the retirement of the load instruction. The timer may be compared to a timeout threshold. The timeout threshold may be fixed or configurable. For example, the timeout threshold may be configured using a field in a control register. The control register may be visible to hardware or software. The timeout threshold may be represented in any suitable manner. For example, it may be represent the number of nanoseconds, or the number of clock cycles corresponding to a timeout. In one embodiment, the timer or counter may be initialized to zero and may increment over time if the data requested by the non-posted load has not arrived. The incremented value may be compared to the timeout threshold. If the incremented value is less than the timeout threshold, the processor or core may continue to wait for the requested to arrive. If the incremented value is greater than the timeout threshold, it may be determined that the timer or counter has expired. In another embodiment, a timer or counter may be initialized to a baseline value, such as the previous counter value or a timeout threshold. The counter may decrement over time if the data requested by the non-posted load has not arrived. The decremented value may be compared to a limit, such as zero, or the difference between the previous counter value and the timeout threshold. If the decremented value is greater than zero, the processor or core may continue to wait for the requested data to arrive. If the decremented value is equal to zero, it may be determined that the timer or counter has expired.

At time 312, an event may arrive at the core or logical processor. The event may be internal or external to the core or processor. The core may be processing the non-posted load instruction and may ignore the event for a period of time. At time 314, the timeout counter may expire. The expiration of the timeout counter may be based on the timeout counter exceeding the timeout threshold 320. The timeout threshold may be tuned for the core, processor, or system to balance the overhead of processing timeouts associated with waiting for data requested by non-posted load operations to arrive and the responsiveness to events that arrive. For example, if an MMIO load operation associated with a non-posted load instruction takes 10 microseconds nominally and a data read from memory takes 15 nanoseconds nominally, the timeout threshold 320 may be set of a value between the memory latency and the MMIO load operation latency, or somewhere between 15 nanoseconds and 10 microseconds. Although specific latencies are described, the timeout threshold may be set to any suitable value for enabling quasi-posted loads. When the timeout counter expires, the non-posted load may become a quasi-posted load by allocating an entry in a data return buffer (DRB). In some embodiments, the entry in the DRB may have been previously allocated and unlocked. Upon expiration of the timeout counter, the entry may be locked. The DRB may be a part of another data buffer, such as a fill buffer or a load buffer, or may be a separate structure. The DRB may include a valid bit for each entry to denote whether the data associated with the load has arrived.

After the timeout counter expires at time 314, the core or logical processor may transition to event handling 332 via transitions 334 and 336. Transition 334 out of the state associated with waiting for the data requested by non-posted load instruction 326 to arrive may complete by time 304 to handle the event after the timeout. Transition 336 into the state for event handling may complete after time 304. Before transitioning to the state for event handling, the core or MEU may evaluate the events that have arrived. For example, the evaluation may rank or prioritize the events to ensure that the most important event is handled first. As another example, the evaluation may determine whether the event may be appropriately handled while the non-posted load is still waiting for data to arrive. Events that may modify the architectural state of the processor or that depend on the data requested by the non-posted load may be filtered out and processed after the non-posted load is retried. Events that cannot modify the architectural state of the processor or that depend on the data requested, may be processed during event handling 332. For example, if the core receives a remote action request (RAR) for a translation lookaside buffer (TLB) shootdown (i.e., invalidation of a page in a TLB), the RAR may be processed by an RAR handler (RARH) before the non-posted load instruction retires or the requested data arrives.

While the event is handled during duration 324, the entry in the DRB may be allocated (328). After the event is handled, the core or processor may transition, as shown by 338, out of the event handling state and may transition, as shown by 340, into the state for processing the non-posted load instruction. At time 306, the quasi-posted load, which may be referred to as the timeout load, may restart execution by waiting for the requested data to arrive. In some embodiments, the restart may enable the entry allocated in the DRB to function as a write back buffer for the data requested. At time 316, the timeout counter may restart. The restart may reset or re-initialize the timeout counter, and the core or logical processor may resume waiting for the requested data to arrive. While the core or processor is waiting for restarted non-posted load 330 to be processed, data may arrive at time 318, and the non-posted load instruction may be retired at time 308, which may be at or shortly after time 318.

As described herein, a quasi-posted load may enable the core or logical processor to process the non-posted load instruction and the handle the event during the duration 322 to process the non-posted load instruction. Without a quasi-posted load the time required to process both the load and the event may be the sum of durations 322 and 324. As duration 324 increases, the performance benefit of quasi-posted loads may also increase. In addition, the event may be handled in a more timely manner. The event may arrive as early as time 302 when the non-posted load is dispatched. Accordingly, the responsiveness of the core or logical processor may be bound by the sum of timeout threshold 320 and duration 324 for handling the event. In a core or logical processor without supports for quasi-posted loads, the time taken to respond to the event may be bound by the sum of duration 322 to the process the non-posted load operation and duration 324 to handle the event. Accordingly, as the difference between timeout threshold 320 and duration 322 to process the non-posted load operation increases, the responsiveness of a system with support for quasi-posted load may improves.

Figure 4:
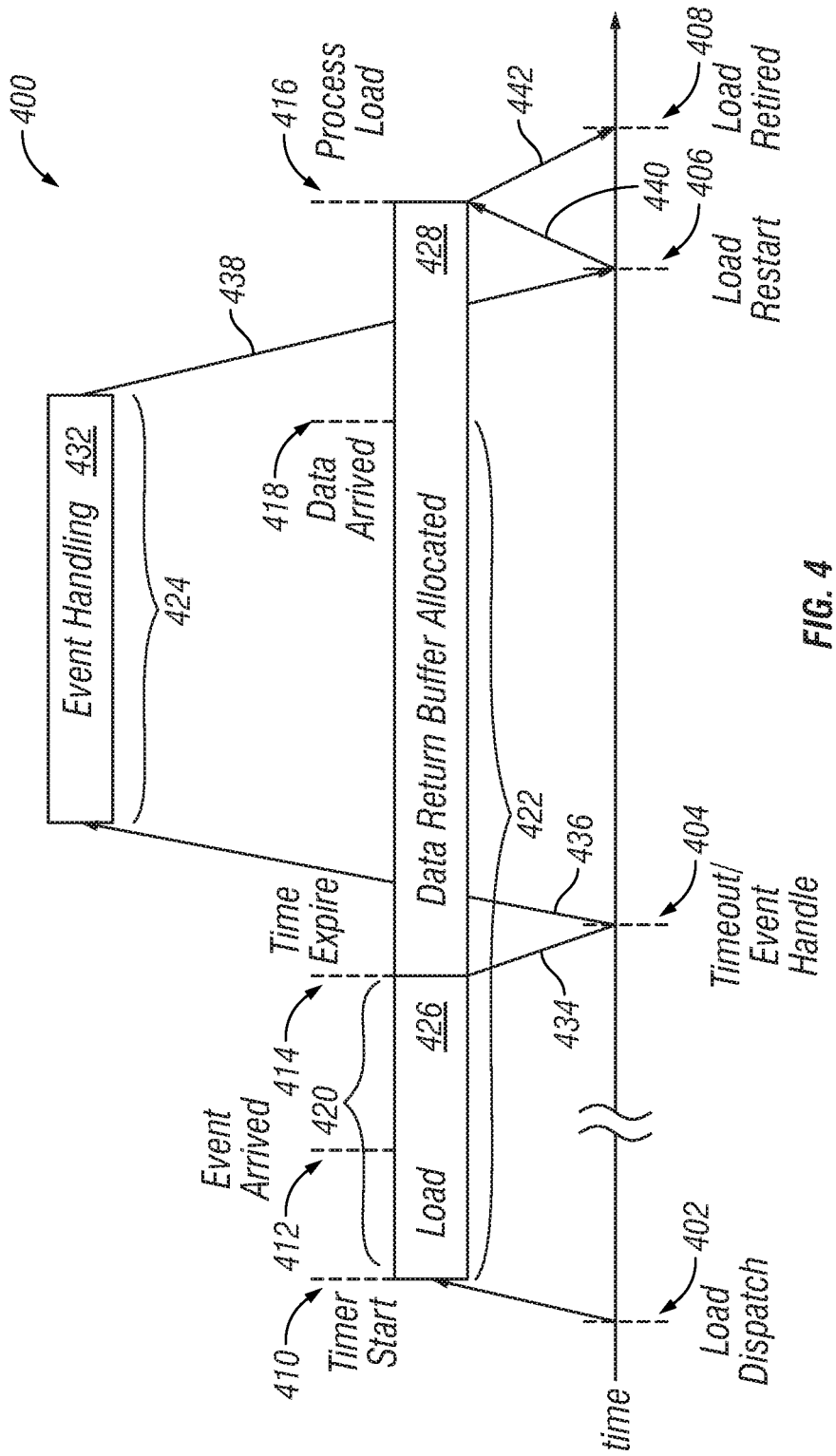
FIG. 4 is a timing diagram illustrating an overview of the operation of a system for quasi-posted loads in which load data arrives during event handling, in accordance with embodiments of the present disclosure.

FIG. 4 is a timing diagram 400 that illustrates an overview of the operation of a system for quasi-posted loads in which load data arrives during event handling, in accordance with embodiments of the present disclosure. Similar to FIG. 3, a non-posted load instruction 426 may be dispatched at time 402. At dispatch or shortly thereafter at time 410, a timer may begin to count the amount of time taken by the non-posted load instruction to complete execution. At time 412, an event may arrive. The timeout threshold 420 may define the period of time to process non-posted load instruction 426 before allocating an entry in a DRB 428. At 414, the timeout counter may expire and the core may transition (434 and 436) before and after time 404 to handle the event that previously arrived. The event handling 432 may continue for duration 424. However, at time 418 the data requested by the non-posted load instruction may arrive while the event is being handled. When the data arrives, a valid bit corresponding to the entry allocated in the DRB may be set.

After the data requested by the non-posted load arrives at time 418, the event may be handled and the core may transition back (438) to restart the non-posted load operation that timed out at time 414. On restart at time 406, the entry allocated in the DRB may be configured to be a write back buffer for the requested data. After transition 440, the quasi-posted load instruction may be processed at time 416. Processing of the quasi-posted load instruction may include deallocating the entry in the DRB that was previously allocated for the non-posted load instruction and/or forwarding data that arrived to another buffer for processing the load instruction. At time 408, the non-posted load instruction may retire after transitioning out, as shown by 442, from processing the load instruction.

When the data requested by a non-posted load arrives during event handling, the duration for data to arrive 422 may be less than the time required to process the load instruction, which may be defined by the duration between dispatch and retirement. Thus, support for quasi-posted loads may add latency to processing load instructions. The additional latency may be bounded by the sum of duration 422 for event handling, and the transitions from the state for event handling 438 and to the state for load processing 440.

Figure 5:
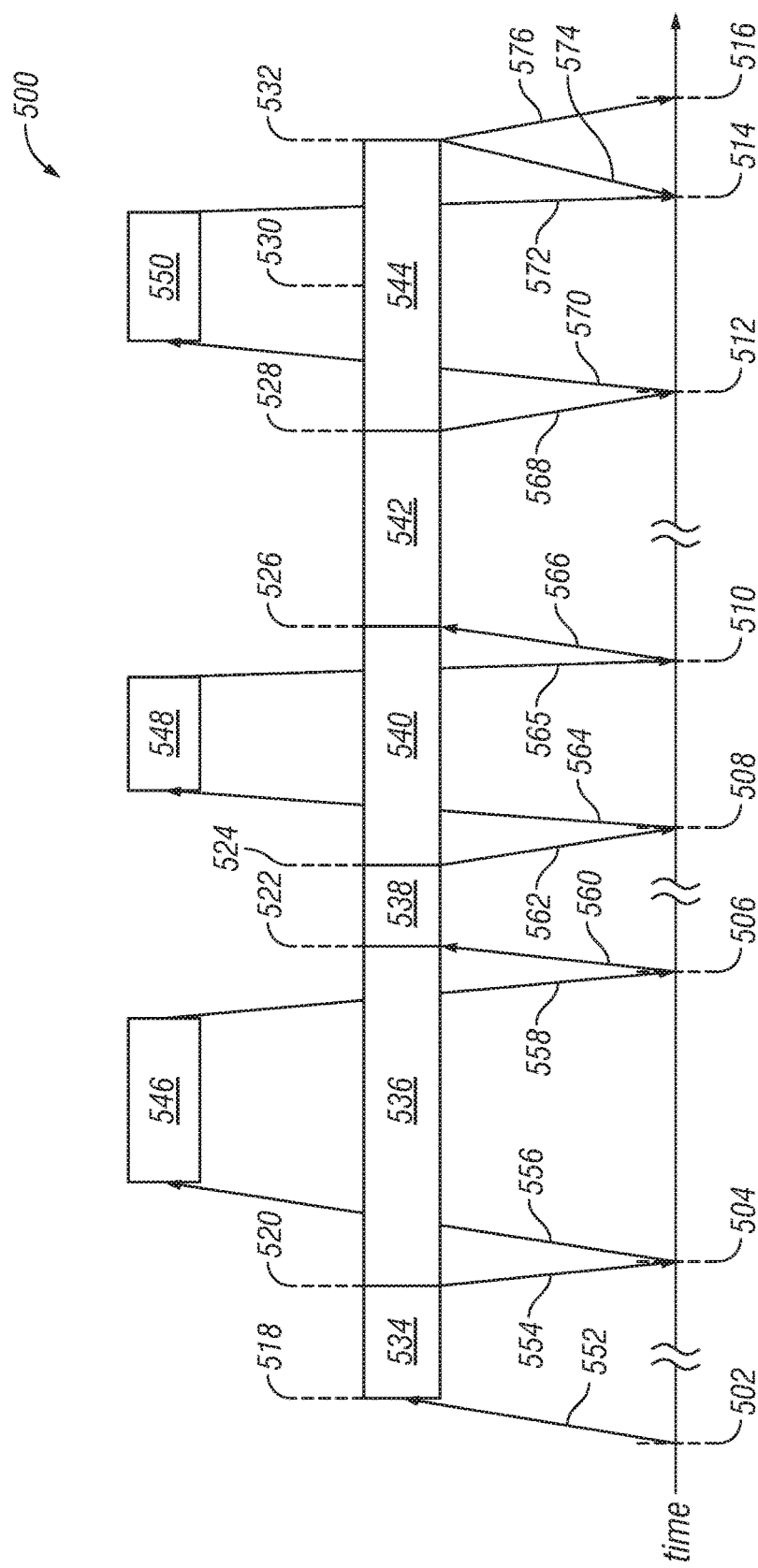
FIG. 5 is a is a timing diagram illustrating an overview of the operation of a system for quasi-posted loads with a long latency, in accordance with embodiments of the present disclosure.

FIG. 5 is a timing diagram 500 that illustrates an overview of the operation of a system for quasi-posted loads with a long latency, in accordance with embodiments of the present disclosure. As noted above, the latency for a non-posted load, such as an MMIO load operation, may be several microseconds, or tens of thousands of processor clock cycles. Accordingly, a timeout threshold may be tuned such that the processor may handle several events while waiting for data requested by the non-posted load operation to arrive.

At 502, the non-posted load instruction may be dispatched and the core may transition, as shown by 552, to a state for processing the instruction. A timeout counter may start at time 518 for non-posted load instruction 534. At time 520, the timer may expire and a timeout event may occur. The core may transition out of waiting for the non-posted load instruction, as shown by 554 before time 504, and may transition into handling an event that previously arrived, as shown by 556 after time 504. While the non-posted load becomes a quasi-posted load with an entry in a DRB as shown by 536, the event may be handled as shown by 546.

After the event is handled, the core may transition out of handling the event, as shown by 558 before time 506, and may transition into waiting for the requested data to arrive, as shown by 560 before at time 522. At time 506, the load instruction may be redispatched. The redispatch may occur without generating a new load request external to the core. At time 522, the entry in the DRB may be released and the timeout counter may restart or may be reset. The non-posted load operation 538 may continue until the timer expires at time 524. The core may transition from processing the load, as shown by 562 before time 508, and may transition into handling an event, as shown by 564 after time 508. No event may be detected as shown by 548 while the quasi-posted load has an entry allocated in the DRB as shown by 540. There may not be an event detected because no event may have arrived previously or no event may be available for handling after filtering out events that may not be executed in parallel with a quasi-posted load operation.

This cycle may repeat until the data requested by the load instruction arrives at time 530, at which time the load may retire after the core transitions out of handling events and into processing the load. For example, the cycle may include transition out of not handling an event, as shown by 565 before time 510, and transition into waiting again for the requested data to arrive, as shown by 566 before time 526. At time 510, the load instruction may be redispatched. At time 526, the entry in the DRB may be released and the timeout counter may restart. The non-posted load operation 542 may continue until the timer expires at time 528. The core may transition from processing the load, as shown by 568 before time 512, and may transition into handling an event, as shown by 570 after time 512. While the non-posted load becomes a quasi-posted load with an entry in a DRB as shown by 544, the event may be handled as shown by 550. At time 530, the data requested by the quasi-posted load may arrive while the event is being handled.

After the data requested by the non-posted load arrives at time 530, the event may be handled and the core may transition back (572) to restart the non-posted load operation that timed out at time 528. On restart at time 514, the entry allocated in the DRB may be configured to be a write back buffer for the requested data. After transition 574, the quasi-posted load instruction may be processed at time 532. At time 516, the non-posted load instruction may retire after a plurality of timer expirations and/or events have been handled by transitioning out from processing the load instruction, as shown by 576.

Figure 6:
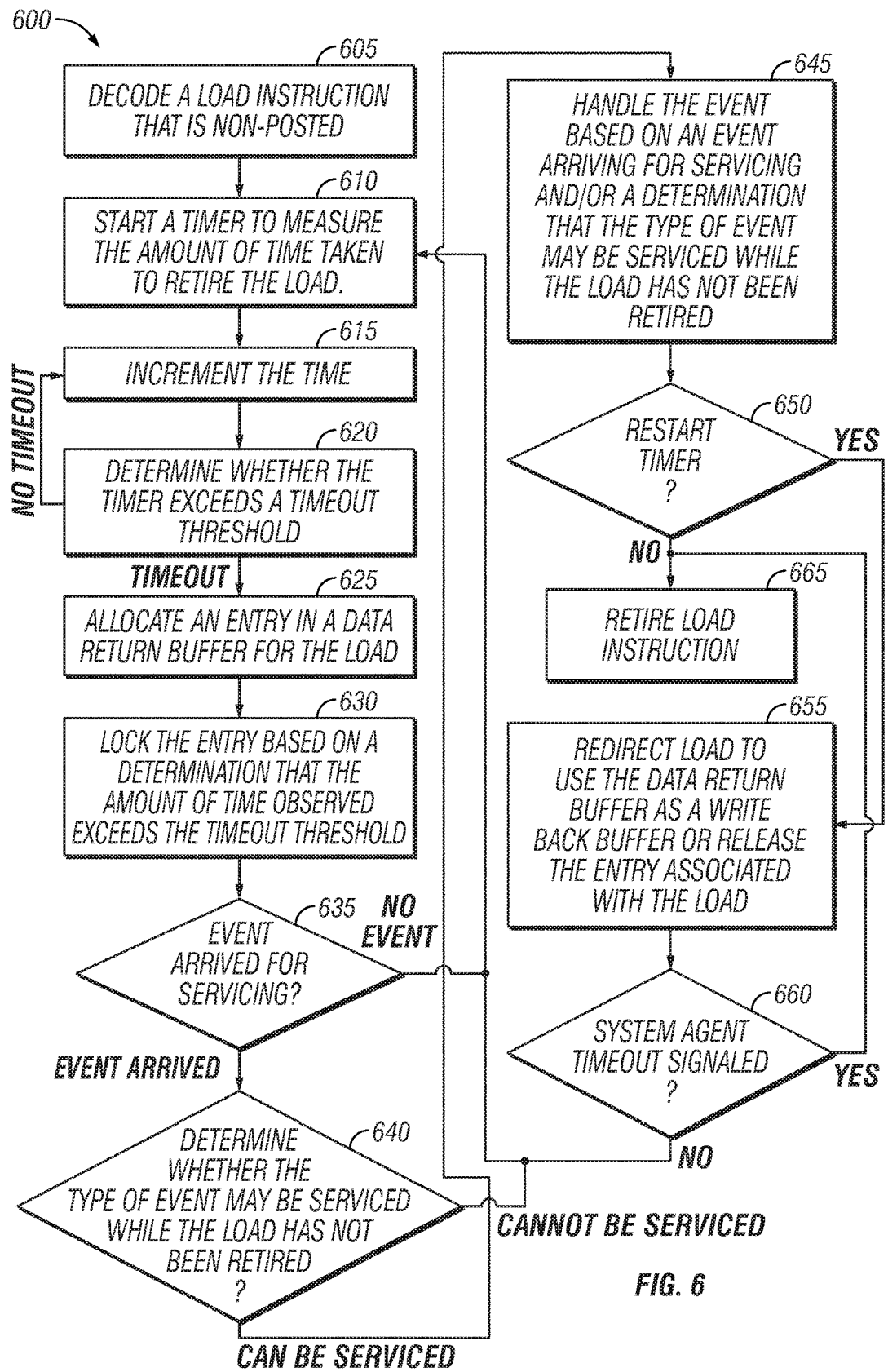
FIG. 6 is a flow chart illustrating a method for supporting quasi-posted loads, in accordance with embodiments of the present disclosure.

FIG. 6 illustrates an example method 600 for supporting quasi-posted loads, according to embodiments of the present disclosure. Method 600 may be implemented by any of the elements shown in FIGS. 1-5 and 7-14. Method 600 may be initiated by any suitable criteria and may initiate operation at any suitable point. In one embodiment, method 600 may initiate operation at 605. Method 600 may include greater or fewer operations than those illustrated. Moreover, method 600 may execute its operations in an order different than those illustrated below. Method 600 may terminate at any suitable operation. Moreover, method 600 may repeat operation at any suitable point. Method 600 may perform any of its operations in parallel with other operations of method 600, or in parallel with operations of other methods.

At 605, a load instruction that is non-posted may be decoded. The load instruction may be an uncacheable load. For example, the load instruction may represent an MMIO load operation. MMIO load operations may require several microseconds, or tens of thousands of processor clock cycles for the requested data to arrive.

At 610, a timer to measure the amount of time taken to return the load may be started. In some embodiments, the timer may be restarted. Initiation of the timer may begin at any suitable point, such as when the load instruction is dispatched. Retirement may require that the data requested by the load instruction arrive. The timer may be associated with a timeout threshold. The timeout threshold may be fixed or configurable. For example, the timeout threshold may be a field in a control register. The control register may be visible to hardware or software. The timeout threshold may be represented in any suitable manner. For example, it may represent the number of nanoseconds or the number of clock cycles corresponding to a timeout. In one embodiment, the timer or counter may be initialized to zero and may increment over time if the data requested by the non-posted load has not arrived. The incremented value may be compared to the timeout threshold. In another embodiment, the timer or counter may be initialized to a baseline value, such as the previous counter value, or a timeout threshold. The counter may decrement over time if the data requested by the non-posted load has not arrived. The decremented value may be compared to a limit, such as zero, or the difference between the previous counter value and the timeout threshold.

At 615, the timer may be incremented. In some embodiments, the timer may be decremented if, for example, the timer is initialized to a non-zero value. At 620, it may be determined whether the timer exceeds a timeout threshold. If the timer does not exceed the timeout threshold, there is no timeout and method 600 may return to 615. If the timer exceeds the timeout threshold, there is a timeout and method 600 may proceed to 625. At 625, an entry may be allocated in a data return buffer (DRB) for the load operation. Allocation of an entry may enable support for quasi-posted loads. In some embodiments, the entry in the DRB may have been previously allocated and unlocked. The DRB may be a part of another data buffer, such as a fill buffer or a load buffer, or may be a separate structure. The DRB may include a valid bit for each entry to denote whether the data associated with the load has arrived.

At 630, the entry may be locked based on a determination that the timer exceeds the timeout threshold. At 635, it may be determined whether an event arrived for servicing. The event may have arrived while waiting for the data requested by the non-posted load instruction to arrive. If no event has arrived for servicing, method 600 may proceed back to 610. If an event arrived, method 600 may proceed to 640. At 640, it may be determined whether the type of event may be serviced while the load has not been retired. For example, the determination may rank or prioritize the events to ensure that the most important event is handled first. As another example, the determination may evaluate whether the event may be appropriately handled while the quasi-posted load is still waiting for data to arrive. Events that modify the architectural state of the processor or that depend on the data requested by the non-posted load may be filtered out and processed after the non-posted load is retried. Events that do not modify the architectural state of the processor or that do not depend on the data requested, may be processed during event handling.

At 645, an event may be handled by the processor based on the event arriving for servicing and/or a determination that the type of event may be serviced while the load has not been retired. For example, if a core receives a remote action request (RAR) for a translation lookaside buffer (TLB) shootdown, the RAR may be processed by an RAR handler (RARH) before the non-posted load instruction retires, or the requested data arrives. A TLB shootdown, which may be requested by an RAR, may result in the invalidation of a page in a TLB. The memory execution unit (MEU) may determine whether the event has been serviced based on the determination that an event arrived or the determination that the event that arrived is the type of event that may be serviced while the load has not been retired.

At 650, it may be determined whether to restart the timer. The determination may be based on whether to deallocate an entry in the data return buffer (DRB) or whether the data from load instruction has arrived. If timer is to be restarted, method 600 may proceed to 655. Otherwise, method 600 may proceed to 665. At 655, the load instruction may be redirected to use the entry in the DRB as a write back buffer. Alternatively, the entry may be deallocated in the DRB. At 660, it may be determined whether the system agent of the processor, or any other suitable part of the processor for servicing non-posted uncacheable loads, has signaled a timeout. The system agent may return null data with an error flag or error bit that is set. This may indicate to the processor that the load instruction failed to execute and that the data will not arrive. For example, an MMIO load operation may be associated with a remote device that is unresponsive. After a certain period of time, the system agent may inform the processor of the error. A core or logical processor may handle the signal from the system agent. In some embodiments, the core or logical processor may retry the load instruction. In other embodiment, the core or logical processor may raise an interrupt to enable error handling associated with a failed load instruction. If the system agent has signaled a timeout, method 600 may proceed to 665. Otherwise, method 600 may return to 610 to repeat the process of waiting for the load instruction to complete execution. At 665, the load instruction may be retired after the requested data arrives. The requested data may reside in a register or a buffer, such as the DRB. Method 600 may repeat or terminate.

The figures described below include detailed examples of architectures and systems to implement embodiments of the hardware components and/or instructions described above.

In some embodiments, one or more hardware components and/or instructions described above may be emulated as described in detail below, or may be implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Core Architectures, Processors, and Computer Architectures

Processor cores may be implemented in different ways, for different purposes, and in different processors. For instance, in various embodiments, such cores may include a general purpose in-order core intended for general-purpose computing, a high-performance general purpose out-of-order core intended for general-purpose computing, and/or a special purpose core intended primarily for graphics and/or scientific computing (e.g., high throughput computing). In various embodiments, different processors may include a CPU, including one or more general purpose in-order cores intended for general-purpose computing and/or one or more general purpose out-of-order cores intended for general-purpose computing, and a coprocessor, including one or more special purpose cores intended primarily for graphics and/or scientific computing (e.g., high throughput computing). Such different processors may lead to different computer system architectures, in different embodiments. For example, in some embodiments, a coprocessor may be on a separate chip than a CPU. In other embodiments, a coprocessor may be on a separate die than a CPU, but may be in the same package as the CPU. In some embodiments, a coprocessor may be on the same die as a CPU. In this case, the coprocessor may sometimes be referred to as special purpose logic, which may include integrated graphics and/or scientific logic (e.g., high throughput logic), or as a special purpose core. In some embodiments, a system on a chip may include, on the same die, a CPU as described above (which may be referred to as the application core(s) or application processor(s)), a coprocessor as described above, and additional functionality. Example core architectures, processors, and computer architectures are described below, according to some embodiments.

Example Core Architectures

In-Order and Out-of-Order Core Block Diagram

Figure 7A:
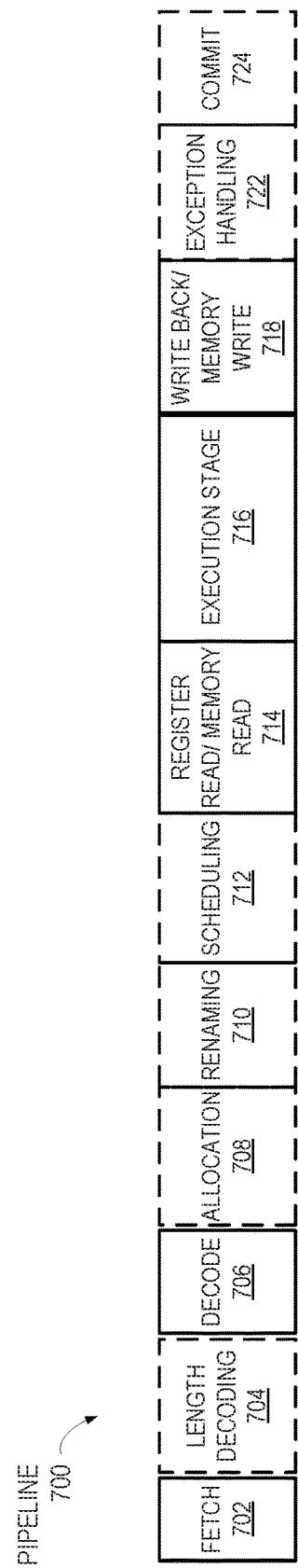
FIG. 7A is a block diagram illustrating both an exemplary in-order pipeline and an exemplary register renaming, out-of-order issue/execution pipeline according to embodiments of the invention.
Figure 7B:
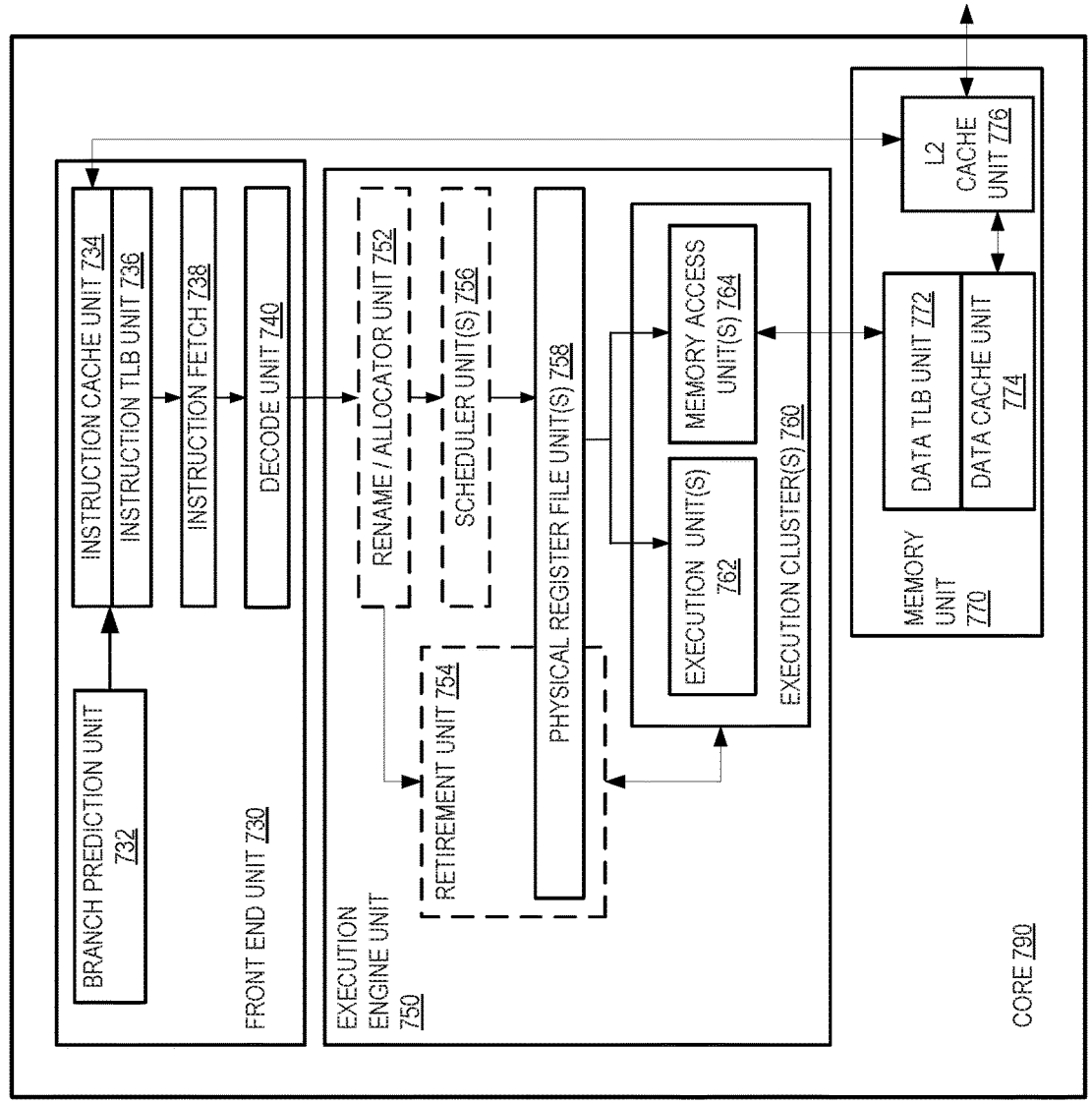
FIG. 7B is a block diagram illustrating both an exemplary embodiment of an in-order architecture core and an exemplary register renaming, out-of-order issue/execution architecture core to be included in a processor according to embodiments of the invention.

FIG. 7A is a block diagram illustrating an example in-order pipeline and a register renaming, out-of-order issue/execution pipeline, according to some embodiments. FIG. 7B is a block diagram illustrating an in-order architecture core and register renaming, out-of-order issue/execution logic to be included in a processor, according to some embodiments. The solid lined boxes in FIG. 7A illustrate the in-order pipeline, while the dashed lined boxes illustrate the register renaming, out-of-order issue/execution pipeline. Similarly, the solid lined boxes in FIG. 7B illustrate the in-order architecture logic, while the dashed lined boxes illustrate the register renaming logic and out-of-order issue/execution logic In FIG. 7A, a processor pipeline 700 includes a fetch stage 702, a length decoding stage 704, a decode stage 706, an allocation stage 708, a renaming stage 710, a scheduling stage 712 (also known as a dispatch or issue stage), a register read/memory read stage 714, an execution stage 716, a write back/memory write stage 718, an exception handling stage 722, and a commit stage 724.

In FIG. 7B, arrows denote a coupling between two or more units and the direction of the arrow indicates a direction of data flow between those units. In this example, FIG. 7B illustrates a processor core 790 including a front end unit 730 coupled to an execution engine unit 750, both of which may be coupled to a memory unit 770. The core 790 may be a reduced instruction set computing (RISC) core, a complex instruction set computing (CISC) core, a very long instruction word (VLIW) core, or a core of a hybrid or alternative core type, in different embodiments. In various embodiments, core 790 may be a special-purpose core, such as, for example, a network core, a communication core, a compression engine, a coprocessor core, a general-purpose computing graphics processing unit (GPGPU) core, a graphics core, or another type of special-purpose core.

In this example, front end unit 730 includes a branch prediction unit 732 coupled to an instruction cache unit 734. Instruction cache unit 734 may be coupled to an instruction translation lookaside buffer (TLB) 736. TLB 736 may be coupled to an instruction fetch unit 738, which may be coupled to a decode unit 740. Decode unit 740 may decode instructions, and may generate as an output one or more micro-operations, micro-code entry points, microinstructions, other instructions, or other control signals, which are decoded from, or which otherwise reflect, or are derived from, the original undecoded instructions. Decode unit 740 may be implemented using any of a variety of suitable mechanisms, in different embodiments. Examples of suitable mechanisms may include, but are not limited to, look-up tables, hardware circuitry, programmable logic arrays (PLAs), microcode read only memories (ROMs). In one embodiment, instruction cache unit 734 may be further coupled to a level 2 (L2) cache unit 776 in memory unit 770. In one embodiment, the core 790 may include a microcode ROM or other medium that stores microcode for certain macroinstructions (e.g., within decode unit 740 or elsewhere within the front end unit 730). The decode unit 740 may be coupled to a rename/allocator unit 752 within the execution engine unit 750.

In this example, execution engine unit 750 includes the rename/allocator unit 752, which may be coupled to a retirement unit 754 and a set of one or more scheduler unit(s) 756. Scheduler unit(s) 756 may represent any number of different schedulers of various types, including those that implement reservations stations or those that implement a central instruction window. As illustrated in this example, scheduler unit(s) 756 may be coupled to physical register file unit(s) 758. Each of the physical register file units 758 may represent one or more physical register files, different ones of which store data of one or more different data types including, but not limited to, scalar integer, scalar floating point, packed integer, packed floating point, vector integer, vector floating point, or status data types. One example of the use of a status data type may be an instruction pointer that indicates the address of the next instruction to be executed. In one embodiment, a physical register file unit 758 may include a vector register unit, a write mask register unit, and a scalar register unit (not shown). These register units may provide architectural vector registers, write mask registers (e.g., vector mask registers), and general-purpose registers.

In FIG. 7B, the physical register file unit(s) 758 are shown as being overlapped by the retirement unit 754 to illustrate various ways in which register renaming and out-of-order execution may be implemented. For example, in different embodiments, register renaming and out-of-order execution may be implemented using one or more reorder buffers and one or more retirement register files; using one or more future files, one or more history buffers, and one or more retirement register files; or using register maps and a pool of registers. In general, the architectural registers may be visible from the outside of the processor and/or from a programmer's perspective. The registers are not limited to any particular known type of circuit. Rather, any of a variety of different types of registers may be suitable for inclusion in core 790 as long as they store and provide data as described herein. Examples of suitable registers include, but are not limited to, dedicated physical registers, dynamically allocated physical registers using register renaming, and combinations of dedicated and dynamically allocated physical registers. In the example illustrated in FIG. 7B, retirement unit 754 and physical register file unit(s) 758 are coupled to the execution cluster(s) 760. Each of execution clusters 760 may include a set of one or more execution units 762 and a set of one or more memory access units 764. Execution units 762 may perform various operations (e.g., shifts, addition, subtraction, multiplication) and may operate on various types of data (e.g., scalar floating point, packed integer, packed floating point, vector integer, vector floating point). While some embodiments may include a number of execution units dedicated to specific functions or sets of functions, other embodiments may include only one execution unit, or may include multiple execution units all of which perform all supported functions or operations. In the example illustrated in FIG. 7B, scheduler unit(s) 756, physical register file unit(s) 758, and execution cluster(s) 760 are shown as potentially including a plurality of such units since some embodiments include separate pipelines for certain types of data/operations. For example, some embodiments may include a scalar integer pipeline, a scalar floating point/packed integer/packed floating point/vector integer/vector floating point pipeline, and/or a memory access pipeline, each of which includes its own scheduler unit, physical register file unit, and/or execution cluster. In some embodiments that include a separate memory access pipeline, only the execution cluster of this pipeline includes a memory access unit 764. It should also be understood that where separate pipelines are used, one or more of these pipelines may be out-of-order issue/execution pipelines and the rest may be in-order execution pipelines.

In the example illustrated in FIG. 7B, the set of memory access units 764 may be coupled to the memory unit 770, which includes a data TLB unit 772. Data TLB unit 772 may be coupled to a data cache unit 774, which in turn may be coupled to a level 2 (L2) cache unit 776. In one example embodiment, the memory access units 764 may include a load unit, a store address unit, and a store data unit, each of which may be coupled to the data TLB unit 772 in the memory unit 770. The L2 cache unit 776 may be coupled to one or more other levels of cache and, eventually, to a main memory. While FIG. 7B illustrates an embodiment in which instruction cache unit 734, data cache unit 774, and level 2 (L2) cache unit 776 reside within core 790, in other embodiments one or more caches or cache units may be internal to a core, external to a core, or apportioned internal to and external to a core in different combinations.

In one example embodiment, the register renaming, out-of-order issue/execution core architecture illustrated in FIG. 7B may implement pipeline 700 illustrated in FIG. 7B as follows. The instruction fetch unit 738 may perform the functions of the fetch and length decoding stages 702 and 704. The decode unit 740 may perform the functions of decode stage 706. The rename/allocator unit 752 may perform the functions of the allocation stage 708 and the renaming stage 710. The scheduler unit(s) 756 may perform the functions of the scheduling stage 712. The physical register file unit(s) 758 and the memory unit 770 may, collectively, perform the functions of the register read/memory read stage 714. The execution cluster(s) 760 may perform the functions of the execution stage 716. The memory unit 770 and the physical register file unit(s) 758 may, collectively, perform the functions of the write back/memory write stage 718. In different embodiments, various units (some of which may not be shown) may be involved in performing the functions of the exception handling stage 722. The retirement unit 754 and the physical register file unit(s) 758 may, collectively, perform the functions of the commit stage 724.

In different embodiments, core 790 may support one or more instructions sets, including the instruction(s) described herein. For example, in various embodiments, core 790 may support the x86 instruction set (with or without extensions that have been included in recent versions); the MIPS instruction set of MIPS Technologies of Sunnyvale, Calif.; and/or the ARM instruction set of ARM Holdings of Sunnyvale, Calif. (with or without optional additional extensions such as NEON. In one embodiment, core 790 may include logic to support a packed data instruction set extension (e.g., AVX1 or AVX2), thereby allowing the operations used by many multimedia applications to be performed using packed data.

In some embodiments, core 790 may support multithreading (e.g., executing two or more parallel sets of operations or threads), and may do so in a variety of ways. Core 790 may, for example, include support for time sliced multithreading, simultaneous multithreading (in which a single physical core provides a logical core for each of the threads that the physical core is simultaneously executing), or a combination of time sliced and simultaneous multithreading. In one embodiment, for example, core 790 may include support for time sliced fetching and decoding, and for simultaneous multithreading in subsequent pipeline stages, such as in the Intel® Hyperthreading technology.

While register renaming is described herein in the context of out-of-order execution, it should be understood that register renaming may be used in an in-order architecture, in some embodiments. While in the example embodiment illustrated in FIG. 7B, core 790 includes separate instruction and data cache units 734 and 774, respectively, and a shared L2 cache unit 776, in other embodiments core 790 may include a single internal cache for both instructions and data, such as, for example, a Level 1 (L1) internal cache, or multiple levels of internal cache. In some embodiments, the system may include a combination of an internal cache and an external cache (e.g., a cache that is external to the core and/or the processor). In other embodiments, all of the caches may be external to the core and/or the processor.

Specific Example In-Order Core Architecture

Figure 8B:
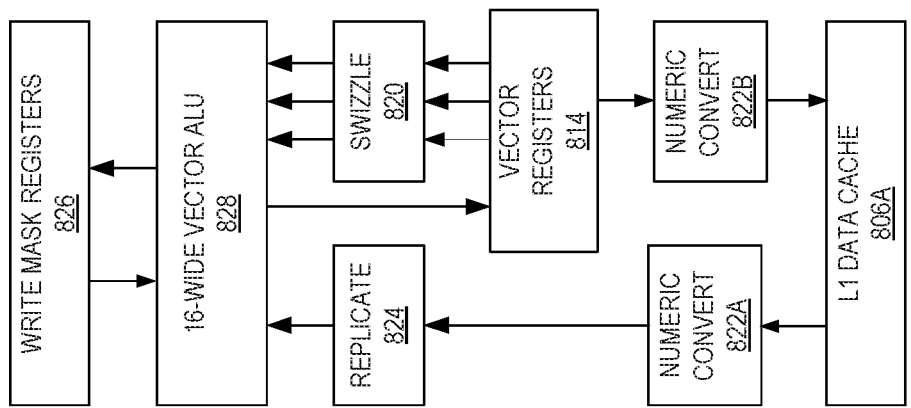
FIGS. 8A-B illustrate a block diagram of a more specific exemplary in-order core architecture, which core would be one of several logic blocks (including other cores of the same type and/or different types) in a chip.
Figure 8A:
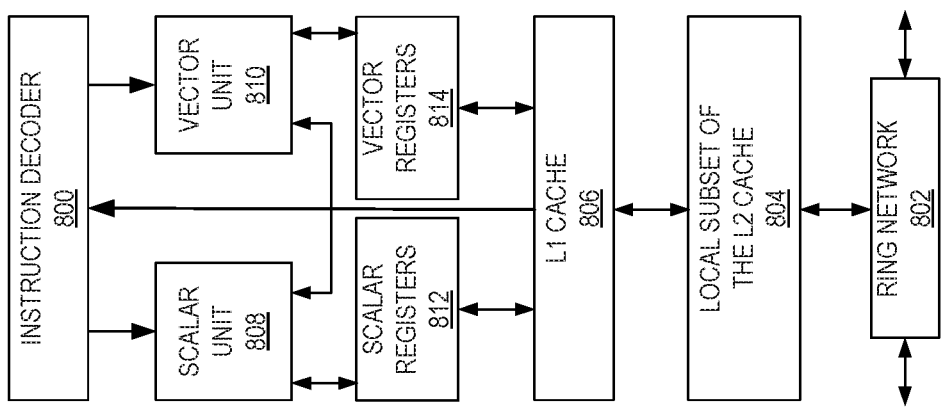

FIGS. 8A and 8B are block diagrams illustrating a more specific example of an in-order core architecture in which a core may be one of several logic blocks (including, for example, other cores of the same type and/or of different types) in a chip. As illustrated in this example, the logic blocks may communicate through a high-bandwidth, on-die interconnect network (e.g., a ring network) with some fixed function logic, memory I/O interfaces, and other necessary I/O logic, depending on the application.

FIG. 8A is a block diagram illustrating a single processor core, along with its connections to an on-die interconnect network (shown as ring network 802) and to its local subset of a Level 2 (L2) cache 804, according to some embodiments. In one embodiment, an instruction decoder 800 may support the x86 instruction set with a packed data instruction set extension. An L1 cache 806 may allow low-latency accesses to cache memory by the scalar and vector units. In one embodiment (e.g., to simplify the design), a scalar unit 808 and a vector unit 810 may use separate register sets (e.g., scalar registers 812 and vector registers 814, respectively) and data that is transferred between them may be written to memory and then read back in from level 1 (L1) cache 806. However, other embodiments may use a different approach. For example, they may include a single register set or may include a communication path that allows data to be transferred between the two register files without being written to memory and read back.

In this example, the local subset of the L2 cache 804 may be part of a global L2 cache that is divided into separate local subsets, e.g., with one subset per processor core. Each processor core may have a direct access path to its own local subset of the L2 cache 804. Data read by a processor core may be stored in its L2 cache subset 804 from which it can be accessed quickly and in parallel with accesses by other processor cores to their own local L2 cache subsets. Data written by a processor core and stored in its own L2 cache subset 804 may be flushed from other L2 cache subsets, if necessary. In some embodiments, the ring network 802 may ensure coherency for shared data. The ring network may be bi-directional to allow agents such as processor cores, L2 caches and other logic blocks to communicate with each other within the chip. In one embodiment, each ring datapath may be 1012 bits wide per direction.

FIG. 8B illustrates an expanded view of part of the processor core illustrated in FIG. 8A, according to some embodiments. In this example, FIG. 8B includes an L1 data cache 806A, which may be part of the L1 cache 804, as well as more detail regarding the vector unit 810 and the vector registers 814. Specifically, the vector unit 810 may be a 16-wide vector processing unit (VPU) that includes a 16-wide vector ALU 828. ALU 828 may be configured to execute one or more of integer, single-precision float, and double-precision float instructions. The VPU may also support swizzling the register inputs (using swizzle unit 820), numeric conversion (using numeric convert units 822A and 822B), and replication (using replication unit 824) on the memory input. The inclusion of write mask registers 826 may allow for predicating resulting vector writes.

Figure 9:
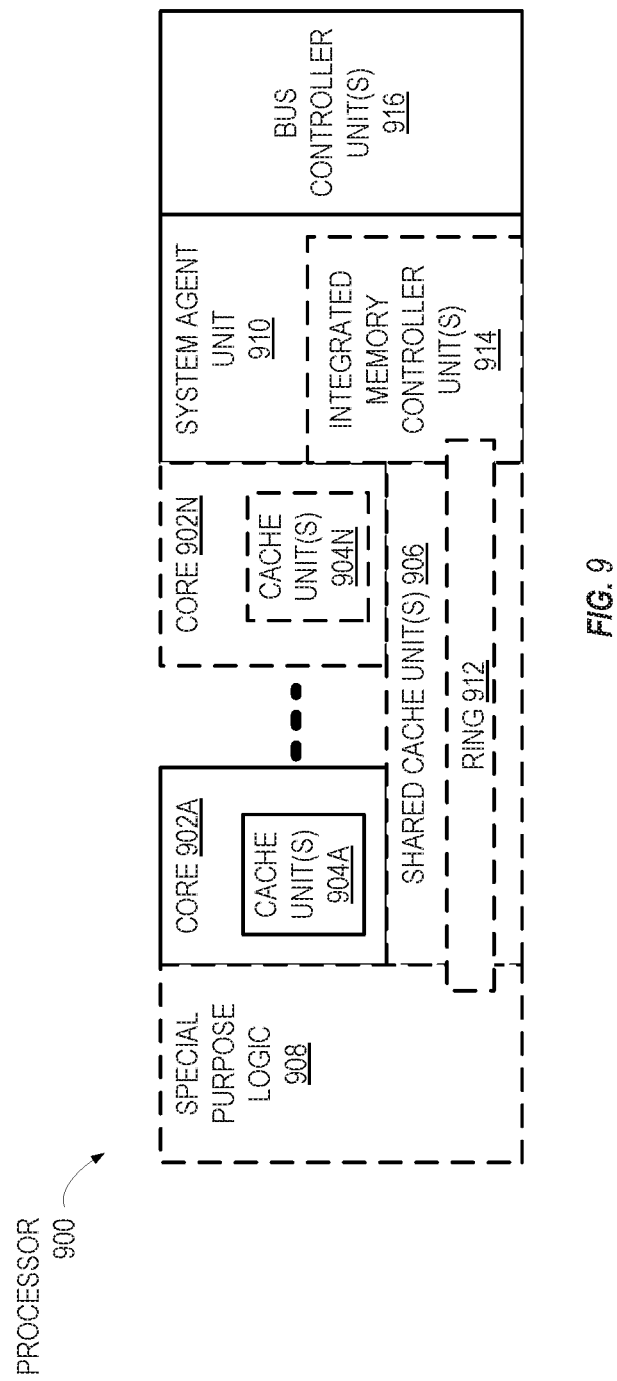
FIG. 9 is a block diagram of a processor that may have more than one core, may have an integrated memory controller, and may have integrated graphics according to embodiments of the invention.

FIG. 9 is a block diagram illustrating a processor 900 that may, in some embodiments, include more than one core, an integrated memory controller, and/or may special purpose logic (such as for integrated graphics computing). The solid lined boxes in FIG. 9 illustrate a processor 900 that includes a single core 902A, a system agent 910, and a set of one or more bus controller units 916. With the optional addition of the dashed lined boxes, an alternative embodiment of processor 900 includes multiple cores 902A-902N, and also includes a set of one or more integrated memory controller unit(s) 914 within the system agent unit 910, and special purpose logic 908. In some embodiments, one or more of cores 902A-902N may be similar to processor core 790 illustrated in FIG. 7B or the processor core illustrated in FIGS. 8A and 8B.

In some embodiments, processor 900 may represent a CPU in which the special purpose logic 908 includes integrated graphics and/or scientific logic (which may include one or more cores), and in which the cores 902A-902N include one or more general purpose cores (e.g., general purpose in-order cores, general purpose out-of-order cores, or a combination of the two). In other embodiments, processor 900 may represent a coprocessor in which the cores 902A-902N include a large number of special purpose cores intended primarily for graphics and/or scientific computing (e.g., high throughput computing). In still other embodiments, processor 900 may represent a coprocessor in which the cores 902A-902N include a large number of general purpose in-order cores. Thus, in different embodiments, the processor 900 may be a general purpose processor, a coprocessor, or a special purpose processor, such as, for example, a network or communication processor, compression engine, graphics processor, GPGPU (general purpose graphics processing unit), a high-throughput "many integrated core" (MIC) coprocessor (including, for example, 30 or more cores), an embedded processor, or another type of processor. The processor 900 may be implemented on one chip or on more than one chip, in different embodiments. The processor 900 may be a part of and/or may be implemented on one or more substrates using any of a number of process technologies, such as, for example, BiCMOS, CMOS, or NMOS.

In the example illustrated in FIG. 9, the memory hierarchy includes one or more levels of cache within each of the cores 902A-902N, shown as cache units 904A-904N, a set of one or more shared cache units 906, and external memory (not shown), some or all of which are coupled to the set of integrated memory controller units 914. The set of shared cache units 906 may include one or more mid-level caches, such as level 2 (L2) cache, a level 3 (L3) cache, a level 4 (L4) cache, other levels of cache, a last level cache (LLC), and/or combinations thereof. In one embodiment, a ring based interconnect unit 912 may be used to interconnect the special purpose logic 908 (which may include integrated graphics logic), the set of shared cache units 906, and the system agent unit 910/integrated memory controller unit(s) 914. In other embodiments, any number of other suitable techniques may be used for interconnecting such units. In one embodiment, coherency may be maintained between one or more cache units 906 and cores 902A-902N.

In another embodiment, one or more shared cache units 906 may be implemented in a module (not shown) accessible to all processing entities of processor 900. In a further embodiment, the module may be implemented in an uncore module of processors from Intel, Inc. The module may include portions or subsystems of processor 900 necessary for the execution of one or more cores 902 but might not be implemented within cores 902. Besides one or more shared cache units 906, the module may include, for example, system agent unit 910, hardware interfaces, memory coherency coordinators, interprocessor interconnects, instruction pipelines, or memory controllers. Access to memory available to processor 900 may be made through the module and, more specifically, integrated memory controller unit(s) 914. Coordination of the instances of core 902 may be facilitated in part through the module.

In some embodiments, one or more of the cores 902A-902N may be capable of multithreading. In some embodiments, the system agent 910 may include circuitry or logic for coordinating and operating cores 902A-902N. For example, the system agent unit 910 may include a power control unit (PCU) and a display unit. The PCU may be or include logic and circuitry for regulating the power state of the cores 902A-902N and the special purpose logic 908 (which may include integrated graphics logic). The display unit may include circuitry or logic for driving one or more externally connected displays.

In various embodiments, the cores 902A-902N may be homogenous or heterogeneous in terms of architecture instruction set. That is, two or more of the cores 902A-902N may be capable of executing the same instruction set, while others may be capable of executing only a subset of that instruction set or may execute a different instruction set.

Example Computer Architectures

Figure 10:
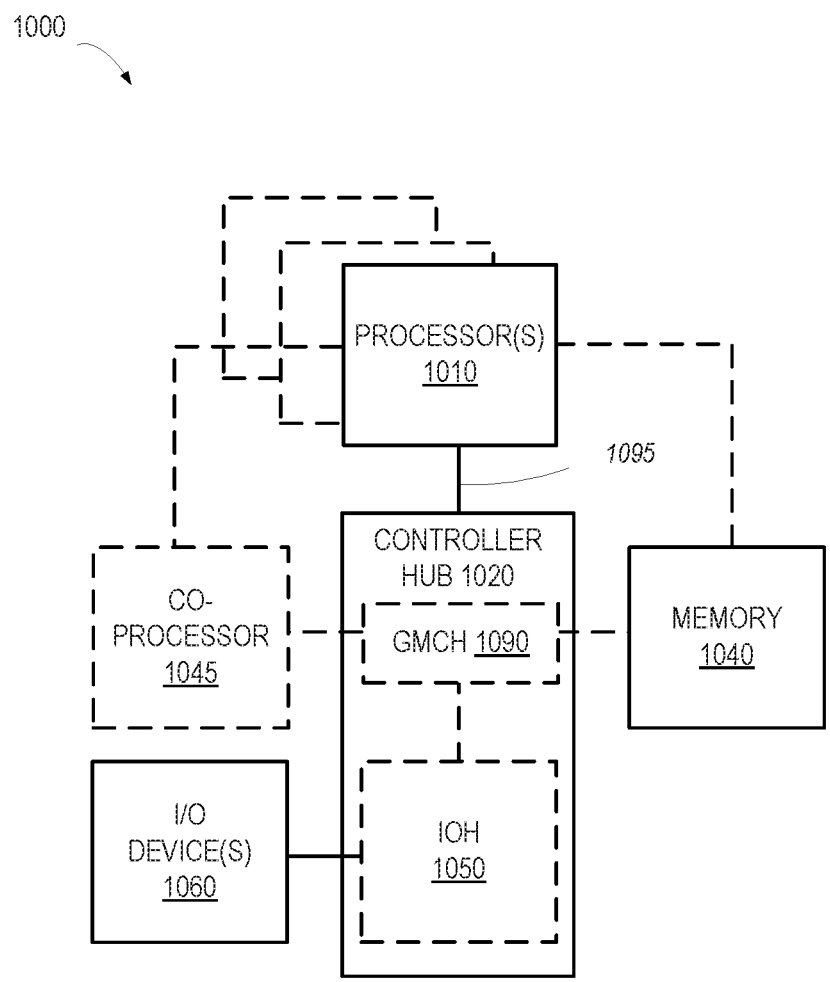
FIGS. 10-13 are block diagrams of exemplary computer architectures.
Figure 11:
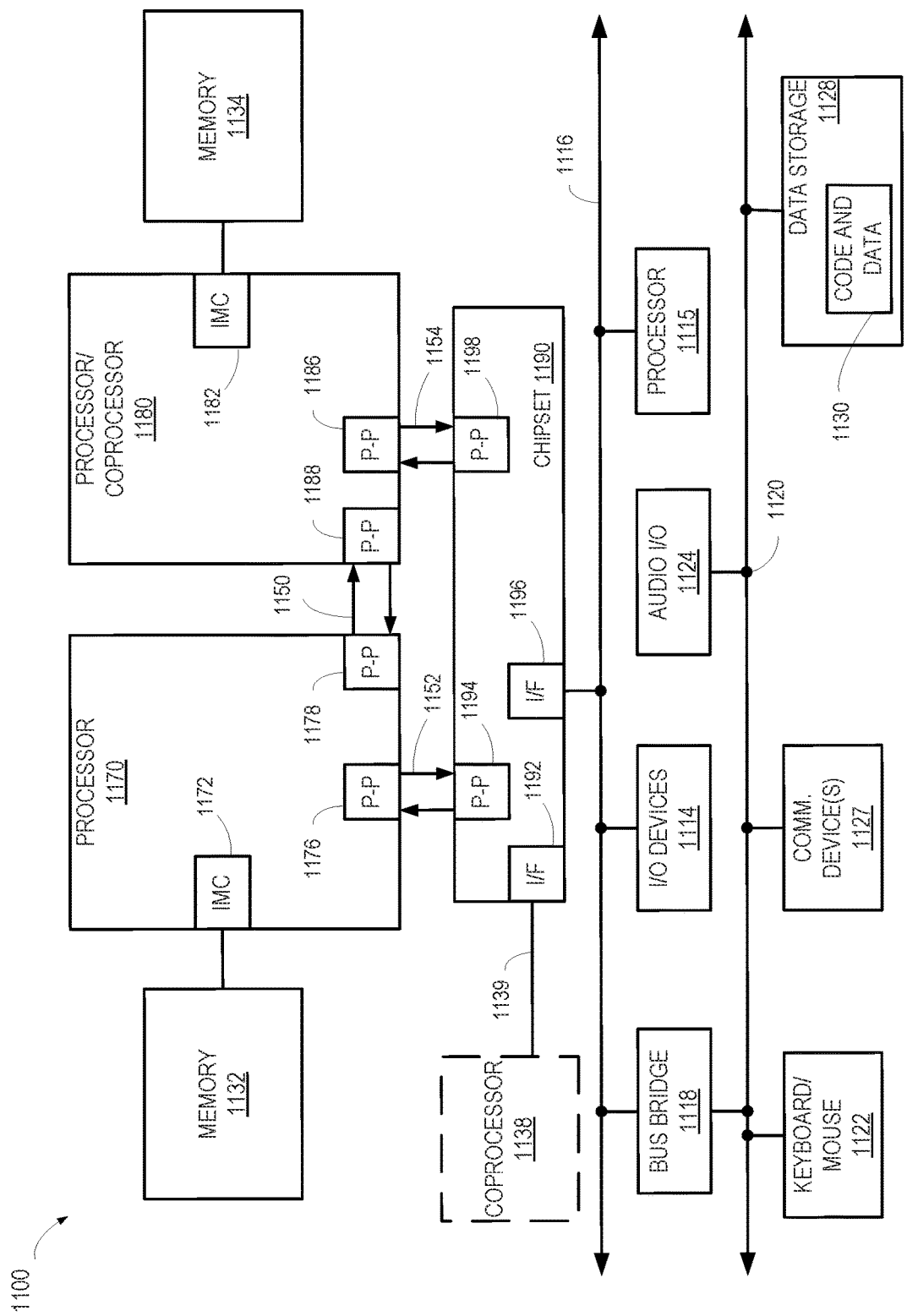
Figure 12:
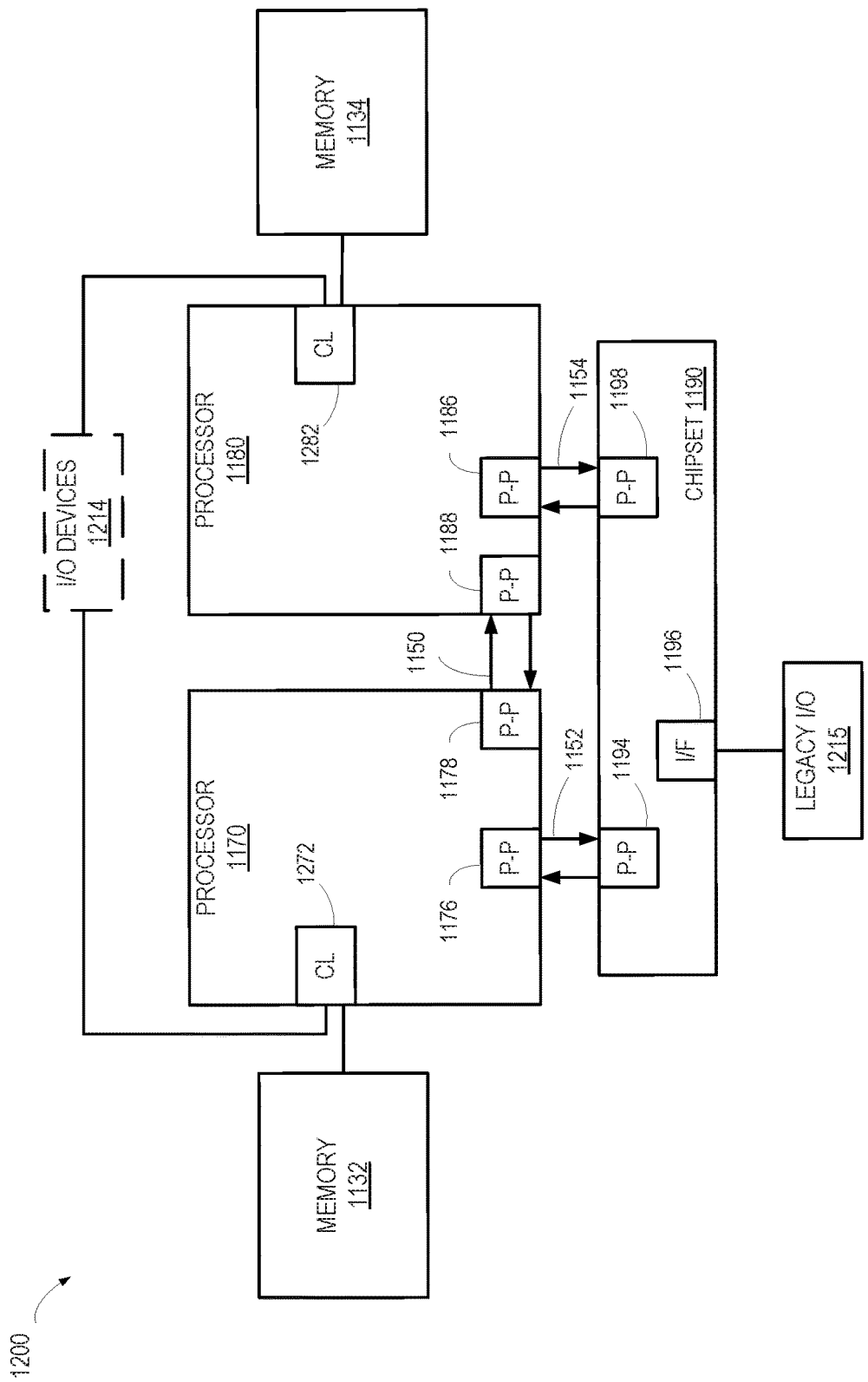
Figure 13:
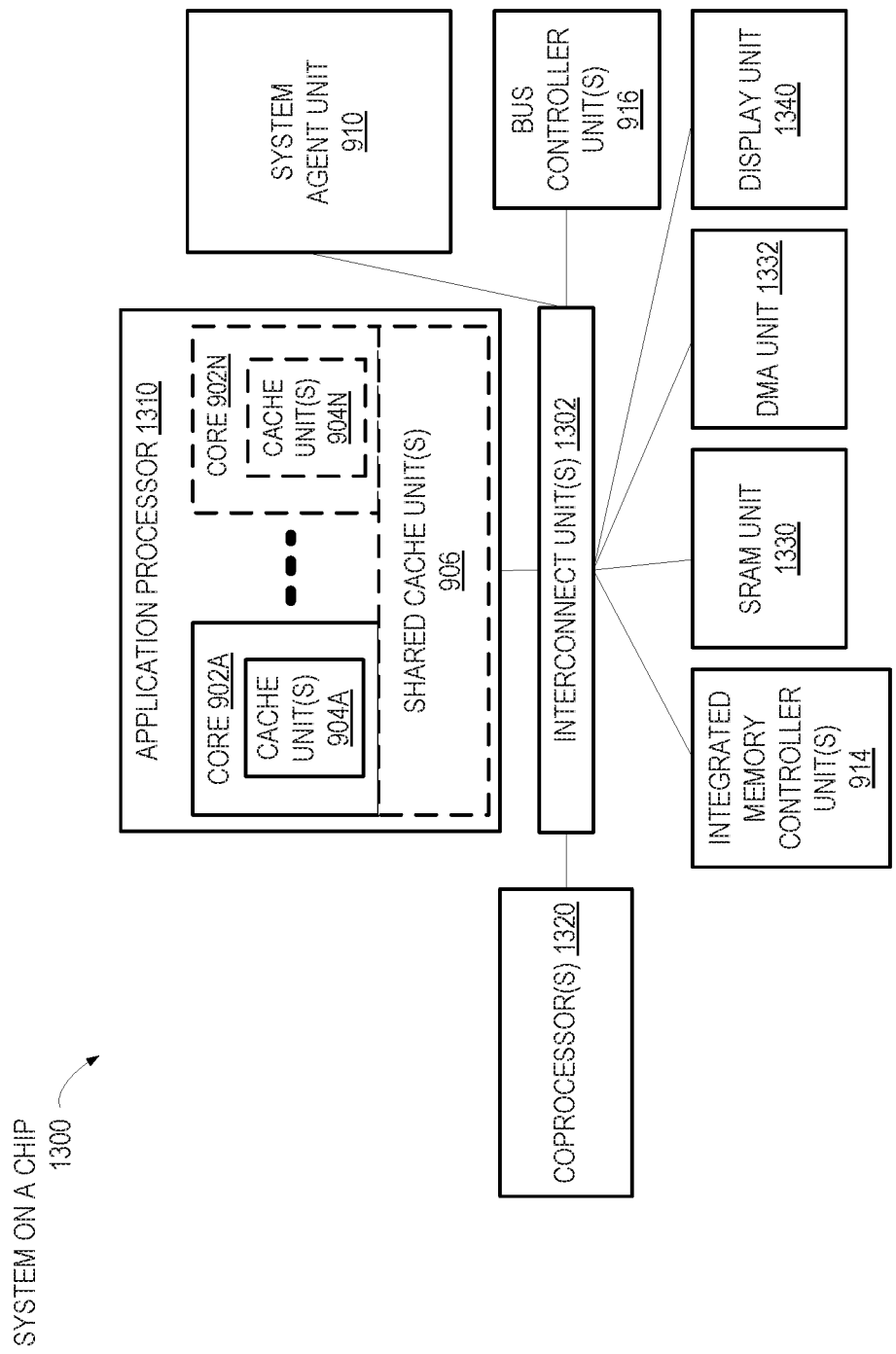

FIGS. 10 through 12 are block diagrams illustrating example systems suitable for the inclusion of one or more processors including, but not limited to, the processors described herein. FIG. 13 illustrates an example system on a chip (SoC) that may include one or more processor cores including, but not limited to, the processor cores described herein. Other system designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable for inclusion of the processors and/or processor cores described herein. In general, a huge variety of systems or electronic devices capable of incorporating a processor and/or other execution logic as disclosed herein are generally suitable for inclusion of the processors and/or processor cores described herein.

FIG. 10 is a block diagram illustrating a system 1000, in accordance with one embodiment of the present disclosure. As illustrated in this example, system 1000 may include one or more processors 1010, which are coupled to a controller hub 1020. In some embodiments, controller hub 1020 may include a graphics memory controller hub (GMCH) 1090 and an Input/Output Hub (IOH) 1050. In some embodiments, GMCH 1090 and IOH 1050 may be on separate chips. In this example, GMCH 1090 may include memory and graphics controllers (not shown) to which are coupled memory 1040 and a coprocessor 1045, respectively. In this example, IOH 1050 couples one or more input/output (I/O) devices 1060 to GMCH 1090. In various embodiments, one or both of the memory and graphics controllers may be integrated within the processor (as described herein), the memory 1040 and/or the coprocessor 1045 may be coupled directly to the processor(s) 1010, or the controller hub 1020 may be implemented in a single chip that includes the IOH 1050.

The optional nature of additional processors 1010 is denoted in FIG. 10 with broken lines. Each processor 1010 may include one or more of the processing cores described herein and may be implemented by a version of the processor 900 illustrated in FIG. 9 and described herein.

In various embodiments, the memory 1040 may, for example, be dynamic random access memory (DRAM), phase change memory (PCM), or a combination of the two. In at least some embodiments, the controller hub 1020 may communicate with the processor(s) 1010 via a multi-drop bus such as a frontside bus (FSB), a point-to-point interface such as QuickPath Interconnect (QPI), or a similar connection, any one of which may be represented in FIG. 10 as interface 1095.

In one embodiment, the coprocessor 1045 may be a special purpose processor, such as, for example, a high-throughput MIC processor, a network or communication processor, a compression engine, a graphics processor, a GPGPU, an embedded processor, or another type of coprocessor. In one embodiment, controller hub 1020 may include an integrated graphics accelerator (not shown).

In some embodiments, there may be a variety of differences between the physical resources of different ones of the processors 1010. For example, there may be differences between the physical resources of the processors in terms of a spectrum of metrics of merit including architectural characteristics, micro-architectural characteristics, thermal characteristics, power consumption characteristics, and/or other performance-related characteristics.

In one embodiment, a processor 1010 may execute instructions that control data processing operations of a general type. Embedded within the instructions may be coprocessor instructions. The processor 1010 may recognize these coprocessor instructions as being of a type that should be executed by the attached coprocessor 1045. Accordingly, the processor 1010 may issue these coprocessor instructions (or control signals representing coprocessor instructions), on a coprocessor bus or other interconnect, to coprocessor 1045. Coprocessor(s) 1045 may accept and execute the received coprocessor instructions.

FIG. 11 is a block diagram illustrating a first example system 1100, in accordance with one embodiment of the present disclosure. As shown in FIG. 11, multiprocessor system 1100 implements a point-to-point interconnect system. For example, system 1100 includes a first processor 1170 and a second processor 1180 coupled to each other via a point-to-point interconnect 1150. In some embodiments, each of processors 1170 and 1180 may be a version of the processor 900 illustrated in FIG. 9. In one embodiment, processors 1170 and 1180 may be implemented by respective processors 1010, while coprocessor 1138 may be implemented by a coprocessor 1045. In another embodiment, processors 1170 and 1180 may be implemented by a processor 1010 and a coprocessor 1045, respectively.

Processors 1170 and 1180 are shown including integrated memory controller (IMC) units 1172 and 1182, respectively. Processor 1170 also includes, as part of its bus controller units, point-to-point (P-P) interfaces 1176 and 1178. Similarly, processor 1180 includes P-P interfaces 1186 and 1188. Processors 1170 and 1180 may exchange information via a point-to-point (P-P) interface 1150 using P-P interface circuits 1178 and 1188. As shown in FIG. 11, IMCs 1172 and 1182 couple the processors to respective memories, shown as memory 1132 and memory 1134, which may be portions of a main memory that are locally attached to the respective processors.

Processors 1170 and 1180 may each exchange information with a chipset 1190 via individual P-P interfaces 1152 and 1154 respectively, using point to point interface circuits 1176, 1194, 1186, and 1198. Chipset 1190 may optionally exchange information with the coprocessor 1138 via interface 1192 over a high-performance interface 1139. In one embodiment, the coprocessor 1138 may be a special purpose processor, such as, for example, a high-throughput MIC processor, a network or communication processor, a compression engine, a graphics processor, a GPGPU, an embedded processor, or another type of special purpose processor. In one embodiment, coprocessor 1138 may include a high-performance graphics circuit and interface 1139 may be a high-performance graphics bus.

A shared cache (not shown) may be included in either processor or outside of both processors, yet may be connected with the processors via a P-P interconnect, such that either or both processors' local cache information may be stored in the shared cache if a processor is placed into a low power mode.

Chipset 1190 may be coupled to a first bus 1116 via an interface 1196. In various embodiments, first bus 1116 may be a Peripheral Component Interconnect (PCI) bus, a PCI Express bus, or another third generation I/O interconnect bus, although the scope of the present disclosure is not limited to these specific bus types.

As shown in FIG. 11, various I/O devices 1114 may be coupled to first bus 1116, along with a bus bridge 1118. Bus bridge 1118 may couple first bus 1116 to a second bus 1120. In one embodiment, one or more additional processor(s) 1115, such as one or more coprocessors, high-throughput MIC processors, GPGPU's, accelerators (e.g., graphics accelerators or digital signal processing (DSP) units), field programmable gate arrays, and/or any other processors, may be coupled to first bus 1116. In one embodiment, second bus 1120 may be a low pin count (LPC) bus. Various devices may be coupled to second bus 1120 including, for example, a keyboard and/or mouse 1122, one or more communication devices 1127 and a data storage unit 1128. Data storage unit 1128 may be a disk drive or another mass storage device, which may include instructions/code and data 1130, in one embodiment. In some embodiments, an audio I/O device 1124 may be coupled to the second bus 1120. Note that other architectures are possible. For example, instead of the point-to-point architecture illustrated in FIG. 11, a system may implement a multi-drop bus or another type of interconnect architecture.

FIG. 12 is a block diagram illustrating a second example system 1200, in accordance with one embodiment of the present disclosure. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170 and 1180 may include integrated memory and I/O control logic ("CL") units 1272 and 1282, respectively. Thus, CL 1272 and CL 1282 may include integrated memory controller units and may also include I/O control logic. FIG. 12 illustrates that not only are the memories 1132 and 1134 coupled to CL 1272 and CL 1282, respectively, but I/O devices 1214 are also coupled to CL 1272 and CL 1282. In this example system, legacy I/O devices 1215 may also be coupled to the chipset 1190 via an interface 1196.

FIG. 13 is a block diagram illustrating a system on a chip (SoC) 1300, in accordance with one embodiment of the present disclosure. Similar elements in FIGS. 13 and 9 bear like reference numerals. Also, dashed lined boxes represent optional features on more advanced SoCs. In FIG. 13, one or more interconnect unit(s) 1302 are coupled to an application processor 1310, which includes a set of one or more cores 902A-902N, including respective local cache units 904A-904N, and shared cache unit(s) 906. The interconnect unit(s) 1302 are also coupled to a system agent unit 910, one or more bus controller unit(s) 916, one or more integrated memory controller unit(s) 914, a set of one or more coprocessors 1320, a static random access memory (SRAM) unit 1330, a direct memory access (DMA) unit 1332, and a display unit 1340 for coupling to one or more external displays. In one embodiment, the coprocessor(s) 1320 may include a special purpose processor, such as, for example, a network or communication processor, a compression engine, a GPGPU, a high-throughput MIC processor, an embedded processor, or another type of coprocessor. In another embodiment, the coprocessor(s) 1320 may be a media processor that includes integrated graphics logic, an image processor, an audio processor, and/or a video processor.

In various embodiments, the mechanisms disclosed herein may be implemented in hardware, software, firmware, or a combination of such implementation approaches. Some embodiments of the disclosure may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and to generate output information. The output information may be applied to one or more output devices, in known fashion. For purposes of this disclosure, a processing system may include any system that includes a processor, such as, for example, a digital signal processor (DSP), a microcontroller, an application specific integrated circuit (ASIC), or a microprocessor.

In some embodiments, the program code may be implemented in a high level procedural or object oriented programming language to communicate with a processing system. The program code may also be implemented in assembly or machine language, in other embodiments. In fact, the mechanisms described herein are not limited in scope to any particular programming language. In general, the programming language may be a compiled language or an interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, sometimes referred to as "IP cores", may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable memories (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off the processor.

Figure 14:
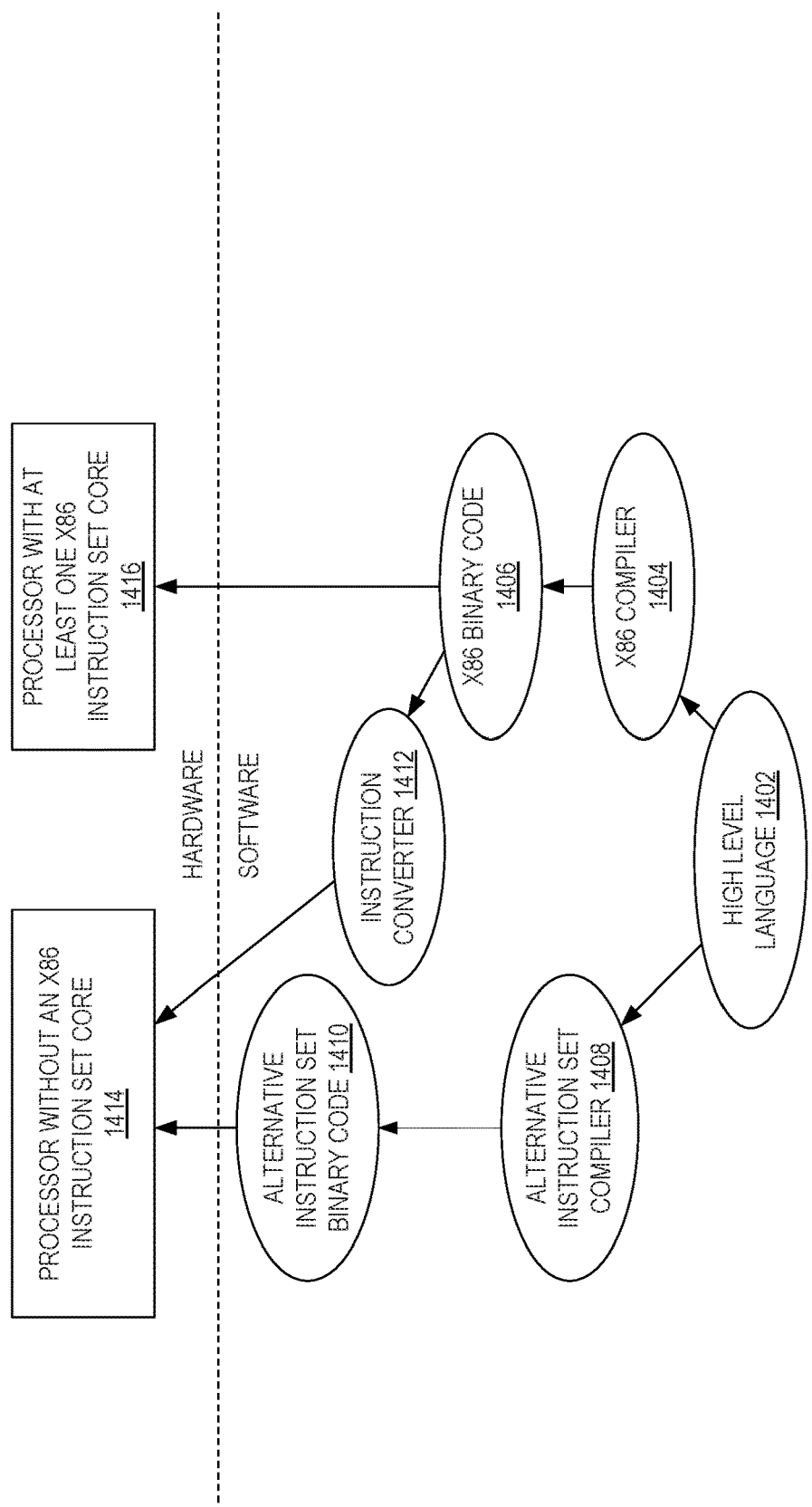
FIG. 14 is a block diagram contrasting the use of a software instruction converter to convert binary instructions in a source instruction set to binary instructions in a target instruction set according to embodiments of the invention.

FIG. 14 is a block diagram illustrating the use of a compiler and a software instruction converter to convert binary instructions in a source instruction set to binary instructions in a target instruction set, according to some embodiments. In the illustrated embodiment, the instruction converter may be a software instruction converter, although in other embodiments the instruction converter may be implemented in software, firmware, hardware, or various combinations thereof. FIG. 14 illustrates that a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that may be operable to generate x86 binary code 1406 (e.g., object code) that may, with or without additional linkage processing, be executed on the processor with at least one x86 instruction set core 1416. Similarly, FIG. 14 illustrates that the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1412 may be used to convert x86 binary code 1406 into code that may be natively executed by the processor without an x86 instruction set core 1414. This converted code might not be the same as the alternative instruction set binary code 1410; however, the converted code will accomplish the general operation and be made up of instructions from the alternative instruction set. Thus, instruction converter 1412 represents software, firmware, hardware, or a combination thereof that, through emulation, simulation or any other process, allows a processor or other electronic device that does not have an x86 instruction set processor or core to execute x86 binary code 1406.

Thus, techniques for performing one or more instructions according to at least one embodiment are disclosed. While certain example embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

In some embodiments of the present disclosure, a processor may include a decoder, a data return buffer, and an execution unit. The decoder may decode an instruction for a non-posted load into a decoded instruction. The instruction may be to load data from memory mapped input/output. The execution unit may be for executing the decoded instruction. The execution unit may: start a timer, determine whether the timer exceeds a timeout threshold, and allocate an entry in the data return buffer, and determine whether an event arrived. The timer may be to measure an amount of time taken to retire the non-posted load instruction. The entry allocated in the data return buffer may be associated with the non-posted load instruction. The determination whether the event arrived may be in response to at least one of: the allocation of the entry in the data return buffer that is associated with the non-posted load instruction and a determination that the timer exceeds the timeout threshold.

In combination with any of the above embodiments, in an embodiment the processor may, based on the determination that the event arrived, determine whether the event has been serviced, receive the data from memory mapped input/output, and retire the non-posted load instruction after a determination that the event has been serviced and the data from the memory mapped input/output has been received. In combination with any of the above embodiments, in an embodiment the execution unit may, based on the determination that the event arrived, determine whether the event has been serviced, restart the timer, in response to the determination that the event has been serviced, and redirect the non-posted load instruction to use the entry in the data return buffer. In combination with any of the above embodiments, in an embodiment the data return buffer may serve as a write back buffer for the non-posted load instruction, which may be after the event has been serviced and the non-posted load instruction is redirected. In combination with any of the above embodiments, in an embodiment the entry may include an identifier for the non-posted load instruction and a valid field associated with the identifier. In combination with any of the above embodiments, in an embodiment the restart may occur without triggering a load operation that is visible external to a core of the processor. In combination with any of the above embodiments, in an embodiment the timer may be a counter and the execution may initialize the counter to the timeout threshold and to decrement the counter. The determination that the timer exceeds the timeout threshold may correspond to the decremented counter reaching zero. In combination with any of the above embodiments, in an embodiment the timer may be a counter and the execution may initialize the counter to zero and increment the counter. The determination that the timer exceeds the timeout threshold corresponds to the decremented counter reaching zero. In combination with any of the above embodiments, in an embodiment the event may be a remote action request to invalidate at least a portion of a translation lookaside buffer of the processor. In combination with any of the above embodiments, in an embodiment the event may have arrived after the non-posted load instruction was decoded. In combination with any of the above embodiments, in an embodiment the timeout threshold may be configured via a control register associated with the execution unit. In combination with any of the above embodiments, in an embodiment the timer may start in response to the non-posted load instruction being dispatched. In combination with any of the above embodiments, in an embodiment the processor may include a first core with a first timeout threshold and a second core with a second timeout threshold. In combination with any of the above embodiments, in an embodiment the data from memory mapped input/output may arrive while the event is being handled. The processor may retire the non-posted load instruction in response to the restart. In combination with any of the above embodiments, in an embodiment the execution unit may, based on the determination that the event arrived, determine whether the event has been serviced, restart the timer, in response to the determination that the event has been serviced, and release an entry allocated in the data return buffer that is associated with the non-posted load instruction, in response to the determination that the event has been serviced. In combination with any of the above embodiments, in an embodiment the data return buffer may be a data fill buffer. The execution unit may lock the entry allocated in the data fill buffer based on the determination that the timer exceeds the timeout threshold. In combination with any of the above embodiments, in an embodiment the processor may include a system agent to signal a timeout associated with the non-posted load instruction. The processor may include a retirement unit to retire the non-posted load instruction with an error associated the signaled timeout.

In some embodiments of the present disclosure, a method may include decoding an instruction for a non-posted load, the instruction may be to load data from memory mapped input/output, starting a timer, the timer may be for measuring an amount of time taken to retire the non-posted load instruction, determining whether the timer exceeds a timeout threshold, allocating an entry in a data return buffer, the entry may be associated with the non-posted load instruction, and determining whether an event arrived based on at least one of: the allocation of the entry associated with the non-posted load instruction and the determination that the timer exceeds the timeout threshold.

In combination with any of the above embodiments, in an embodiment the method may include, based on determining that the event arrived, determining whether the event has been serviced, receiving the data from memory mapped input/output, and retiring the non-posted load instruction after determining that the event has been serviced and the data from memory mapped input/output has been received. In combination with any of the above embodiments, in an embodiment the method may, based on determining that the event arrived, determining whether the event has been serviced, restarting the timer in response to determining that the event has been serviced and redirecting the non-posted load instruction to use the entry in the data return buffer. In combination with any of the above embodiments, in an embodiment the method may include restarting the timer in response to the determination that event has been serviced and redirecting the non-posted load instruction to use the entry in the data return buffer. In combination with any of the above embodiments, in an embodiment the data return buffer may serve as a write back buffer for the non-posted load instruction after the non-posted load instruction is redirected. In combination with any of the above embodiments, in an embodiment the method may include retiring the non-posted load instruction based on a status of the entry in the data return buffer after the restart occurs. The status may indicate that the entry in the data return buffer is valid. In combination with any of the above embodiments, in an embodiment the entry may include an identifier for the non-posted load instruction and a valid field associated with the identifier. In combination with any of the above embodiments, in an embodiment the restart may occur without triggering another load operation. In combination with any of the above embodiments, in an embodiment the timer may be a counter. The method may include initializing a counter to the timeout threshold and decrementing the counter, wherein the determination that the timer exceeds the timeout threshold corresponds to the decremented counter reaching zero. In combination with any of the above embodiments, in an embodiment the timer may be a counter. The method may include initializing a counter to zero and incrementing the counter, wherein the determination that the timer exceeds the timeout threshold corresponds to the incremented counter exceeding the timeout threshold. In combination with any of the above embodiments, in an embodiment the event may be a remote action request to invalidate at least a portion of a translation lookaside buffer. In combination with any of the above embodiments, in an embodiment the event may arrive after the non-posted load instruction was decoded. In combination with any of the above embodiments, in an embodiment the method may include configuring the timeout threshold via a control register. In combination with any of the above embodiments, in an embodiment the timer may start in response to dispatch of the instruction. In combination with any of the above embodiments, in an embodiment the data from memory mapped input/output may arrive while responding to the event. The method may include retiring the non-posted load instruction in response to the restart. In combination with any of the above embodiments, in an embodiment the method may include based on determining that the event arrived, determining whether the event has been serviced, restarting the timer based on determining that the event has been serviced, and releasing the entry allocated in the data return buffer and associated with the instruction based on determining that the event has been serviced. In combination with any of the above embodiments, in an embodiment the data return buffer may be a data fill buffer and the method may include locking the entry allocated in the data fill buffer based on the determination that the timer exceeds the timeout threshold. In combination with any of the above embodiments, in an embodiment the method may include receiving a signal associated with a timeout of the non-posted load instruction to load data from memory mapped input/output and retiring the non-posted load instruction with an error associated with the signaled timeout.

In some embodiments of the present disclosure, a system may include a decoder, a data return buffer, and an execution unit. The decoder may decode an instruction for a non-posted load into a decoded instruction. The instruction may be to load data from memory mapped input/output. The execution unit may be for executing the decoded instruction. The execution unit may: start a timer, determine whether the timer exceeds a timeout threshold, and allocate an entry in the data return buffer, and determine whether an event arrived. The timer may be to measure an amount of time taken to retire the non-posted load instruction. The entry allocated in the data return buffer may be associated with the non-posted load instruction. The determination whether the event arrived may be in response to at least one of: the allocation of the entry in the data return buffer that is associated with the non-posted load instruction and a determination that the timer exceeds the timeout threshold.

In combination with any of the above embodiments, in an embodiment the system may, based on the determination that the event arrived, determine whether the event has been serviced, receive the data from memory mapped input/output, and retire the non-posted load instruction after a determination that the event has been serviced and the data from the memory mapped input/output has been received. In combination with any of the above embodiments, in an embodiment the execution unit may, based on the determination that the event arrived, determine whether the event has been serviced, restart the timer, in response to the determination that the event has been serviced, and redirect the non-posted load instruction to use the entry in the data return buffer. In combination with any of the above embodiments, in an embodiment the data return buffer may serve as a write back buffer for the non-posted load instruction, which may be after the event has been serviced and the non-posted load instruction is redirected. In combination with any of the above embodiments, in an embodiment the entry may include an identifier for the non-posted load instruction and a valid field associated with the identifier. In combination with any of the above embodiments, in an embodiment the restart may occur without triggering a load operation that is visible external to a core of the system. In combination with any of the above embodiments, in an embodiment the timer may be a counter and the execution may initialize the counter to the timeout threshold and to decrement the counter. The determination that the timer exceeds the timeout threshold may correspond to the decremented counter reaching zero. In combination with any of the above embodiments, in an embodiment the timer may be a counter and the execution may initialize the counter to zero and increment the counter. The determination that the timer exceeds the timeout threshold corresponds to the decremented counter reaching zero. In combination with any of the above embodiments, in an embodiment the event may be a remote action request to invalidate at least a portion of a translation lookaside buffer of the system. In combination with any of the above embodiments, in an embodiment the event may have arrived after the non-posted load instruction was decoded. In combination with any of the above embodiments, in an embodiment the timeout threshold may be configured via a control register associated with the execution unit. In combination with any of the above embodiments, in an embodiment the timer may start in response to the non-posted load instruction being dispatched. In combination with any of the above embodiments, in an embodiment the system may include a first core with a first timeout threshold and a second core with a second timeout threshold. In combination with any of the above embodiments, in an embodiment the system may include the data from memory mapped input/output arriving while the event is being handled. The system may retire the non-posted load instruction in response to the restart. In combination with any of the above embodiments, in an embodiment the execution unit may, based on the determination that the event arrived, determine whether the event has been serviced, restart the timer, in response to the determination that the event has been serviced, and release an entry allocated in the data return buffer that is associated with the non-posted load instruction, in response to the determination that the event has been serviced. In combination with any of the above embodiments, in an embodiment the data return buffer may be a data fill buffer. The execution unit may lock the entry allocated in the data fill buffer based on the determination that the timer exceeds the timeout threshold. In combination with any of the above embodiments, in an embodiment the system may include a system agent to signal a timeout associated with the non-posted load instruction. The system may include a retirement unit to retire the non-posted load instruction with an error associated the signaled timeout.

In some embodiments of the present disclosure, a memory execution unit may start a timer, the timer may be to measure an amount of time taken to retire an operation for a non-posted load, the operation may be to load data from memory mapped input/output, determine whether the timer exceeds a timeout threshold, and allocate an entry in a data return buffer, the entry may be associated with the non-posted load instruction, and determine whether an event arrived, the determination may be in response to at least one of: the allocation of the entry associated with the non-posted load instruction and a determination that the timer exceeds the timeout threshold.

In combination with any of the above embodiments, in an embodiment the memory execution unit may, based on the determination that the event arrived, determine whether the event has been serviced, receive the data from memory mapped input/output, and buffer the received data for the retirement of the non-posted load instruction after a determination that the event has been serviced and the data from memory mapped input/output has been received. In combination with any of the above embodiments, in an embodiment the memory execution unit may, based on the determination that the event arrived, determine whether the event has been serviced, restart the timer in response to the determination that the event has been serviced, and redirect the non-posted load instruction to use the entry in the data return buffer. In combination with any of the above embodiments, in an embodiment the data return buffer may serve as a write back buffer for the non-posted load instruction after the non-posted load instruction is redirected. In combination with any of the above embodiments, in an embodiment the memory execution unit may identify that the entry in the data return buffer is valid after the restart occurs for the retirement of the non-posted instruction. In combination with any of the above embodiments, in an embodiment the entry may include an identifier for the non-posted load instruction and a valid field associated with the identifier. In combination with any of the above embodiments, in an embodiment the memory execution unit may restart without another load operation being triggered. In combination with any of the above embodiments, in an embodiment the timer may be a counter. The memory execution unit may initialize the counter to the timeout threshold and decrement the counter. The determination that the timer exceeds the timeout threshold corresponds to the decremented counter reaching zero. In combination with any of the above embodiments, in an embodiment the timer may be a counter. The memory execution unit may initialize the counter to zero and increment the counter. The determination that the timer exceeds the timeout threshold corresponds to the incremented counter exceeding the timeout threshold. In combination with any of the above embodiments, in an embodiment the event may be a remote action request to invalidate at least a portion of a translation lookaside buffer. In combination with any of the above embodiments, in an embodiment the timeout threshold may be configured via a control register associated with the memory execution unit. In combination with any of the above embodiments, in an embodiment the timer may start on dispatch of the non-posted load instruction. In combination with any of the above embodiments, in an embodiment the data from memory mapped input/output may arrive while the event is being handled. The memory execution unit may provide the data for retirement of the non-posted load instruction in response to the restart. In combination with any of the above embodiments, in an embodiment the memory execution unit may, based on the determination that the event arrived, determine whether the event has been serviced, restart the timer, in response to the determination that the event has been serviced, and release the entry allocated in the data return buffer associated with the non-posted load instruction, in response to the determination that the event has been serviced. In combination with any of the above embodiments, in an embodiment the data return buffer may be a data fill buffer. The memory execution unit may lock the entry allocated in the data fill buffer based on the determination that the timer exceeds the timeout threshold.

In some embodiments of the present disclosure, an apparatus may include a means for decoding an instruction for a non-posted load, the instruction may be a means for loading data from memory mapped input/output, a means for starting a timing means, the timing means may be a means for measuring an amount of time taken to retire the non-posted load instruction, a means for determining whether the timing means exceeds a timeout threshold, a means for allocating an entry in a data return buffer means, the entry may be associated with the non-posted load instruction, and a means for determining whether an event arrived based on at least one of: the means for allocating of the entry associated with the non-posted load instruction and the means for determining that the timing means exceeds the timeout threshold.

In combination with any of the above embodiments, in an embodiment the apparatus may include a means for determining whether the event has been serviced based on the determination that the event arrived, a means for receiving the data from memory mapped input/output, and a means for retiring the non-posted load instruction after the means for determining that the event has been serviced and the data from memory mapped input/output has been received. In combination with any of the above embodiments, in an embodiment the apparatus may include a means for determining whether the event has been serviced based on the determination that the event arrived, a means for restarting the timing means in response to the determination that the event has been serviced, and a means for redirecting the non-posted load instruction to use the entry in the data return buffer means. In combination with any of the above embodiments, in an embodiment the apparatus may include a means for restarting the timing means in response to a means for determining whether the event has been serviced based on the determination that the event arrived and a means for redirecting the non-posted load instruction to use the entry in the data return buffer means. In combination with any of the above embodiments, in an embodiment the data return buffer means may serve as a write back buffer means for the non-posted load instruction after the non-posted load instruction is redirected. In combination with any of the above embodiments, in an embodiment the apparatus may include a means for retiring the non-posted load instruction based on a status of the entry in the data return buffer means after the restart occurs. The status may indicate that the entry in the data return buffer means is valid. In combination with any of the above embodiments, in an embodiment the entry may include an identifier means for the non-posted load instruction and a valid means associated with the identifier means. In combination with any of the above embodiments, in an embodiment the restart may occur without triggering another load operation. In combination with any of the above embodiments, in an embodiment the timing means may be a counting means. The apparatus may include a means for initializing a counting means to the timeout threshold and a means for decrementing the counting means, wherein the means for determining that the timing means exceeds the timeout threshold corresponds to the decremented counting means reaching zero. In combination with any of the above embodiments, in an embodiment the timing means may be a counting means. The apparatus may include a means for initializing a counting means to zero and a means for incrementing the counting means, wherein the means for determining that the timing means exceeds the timeout threshold corresponds to the incremented counting means exceeding the timeout threshold. In combination with any of the above embodiments, in an embodiment the event may be a remote action request to invalidate at least a portion of a translation lookaside buffer. In combination with any of the above embodiments, in an embodiment the event may arrive after the non-posted load instruction was decoded. In combination with any of the above embodiments, in an embodiment the apparatus may include a means for configuring the timeout threshold via a control register. In combination with any of the above embodiments, in an embodiment the timing means may start in response to dispatch of the instruction. In combination with any of the above embodiments, in an embodiment the data from memory mapped input/output may arrive while responding to the event. The apparatus may include a means for retiring the non-posted load instruction in response to the restart. In combination with any of the above embodiments, in an embodiment the apparatus may include a means for determining whether the event has been serviced based on the means for determining that the event arrived, a means for restarting the timing means in response to servicing the event and releasing the entry allocated in the data return buffer means and the entry associated with the instruction in response to servicing the event. In combination with any of the above embodiments, in an embodiment the data return buffer means may be a data fill buffer means and the apparatus may include a means for locking the entry allocated in the data fill buffer based on the means for determining that the timing means exceeding the timeout threshold. In combination with any of the above embodiments, in an embodiment the apparatus may include a means for receiving a signal associated with a timeout of the non-posted load instruction to load data from memory mapped input/output and a means for retiring the non-posted load instruction with an error associated with the signaled timeout.

In some embodiments of the present disclosure, at least one machine readable storage medium may include computer-executable instructions. The instructions may be readable by a processor, when read and executed by the processor, for causing the processor to decode an instruction for a non-posted load, the instruction may be to load data from memory mapped input/output, start a timer, the timer may be for measuring an amount of time taken to retire the non-posted load instruction, determine whether the timer exceeds a timeout threshold, allocate an entry in a data return buffer, the entry may be associated with the non-posted load instruction, and determine whether an event arrived based on at least one of: the allocation of the entry associated with the non-posted load instruction and the determination that the timer exceeds the timeout threshold.

In combination with any of the above embodiments, in an embodiment the instructions may cause the processor to, based on the determination that the event arrived, determine whether the event has been serviced, receive the data from memory mapped input/output, and retire the non-posted load instruction after the determination that the event has been serviced and the data from memory mapped input/output has been received. In combination with any of the above embodiments, in an embodiment the instructions may cause the processor to, based on the determination that the event arrived, determine whether the event has been serviced, restart the timer in response to the determination that the event has been serviced, and redirect the non-posted load instruction to use the entry in the data return buffer. In combination with any of the above embodiments, in an embodiment the instructions may cause the processor to restart the timer in response to the determination that the event has been serviced, and redirect the non-posted load instruction to use the entry in the data return buffer. In combination with any of the above embodiments, in an embodiment the data return buffer may serve as a write back buffer for the non-posted load instruction after the non-posted load instruction is redirected. In combination with any of the above embodiments, in an embodiment the instructions may cause the processor to retire the non-posted load instruction based on a status of the entry in the data return buffer after the restart occurs. The status may indicate that the entry in the data return buffer is valid. In combination with any of the above embodiments, in an embodiment the entry may include an identifier for the non-posted load instruction and a valid field associated with the identifier. In combination with any of the above embodiments, in an embodiment the restart may occur without triggering another load operation. In combination with any of the above embodiments, in an embodiment the timer may be a counter. In combination with any of the above embodiments, in an embodiment the instructions may cause the processor to initialize a counter to the timeout threshold and decrement the counter, wherein the determination that the timer exceeds the timeout threshold corresponds to the decremented counter reaching zero. In combination with any of the above embodiments, in an embodiment the timer may be a counter. In combination with any of the above embodiments, in an embodiment the instructions may cause the processor to initialize a counter to zero and increment the counter, wherein the determination that the timer exceeds the timeout threshold corresponds to the incremented counter exceeding the timeout threshold. In combination with any of the above embodiments, in an embodiment the event may be a remote action request to invalidate at least a portion of a translation lookaside buffer. In combination with any of the above embodiments, in an embodiment the event may arrive after the non-posted load instruction was decoded. In combination with any of the above embodiments, in an embodiment the instructions may cause the processor to configure the timeout threshold via a control register. In combination with any of the above embodiments, in an embodiment the timer may start in response to dispatch of the instruction. In combination with any of the above embodiments, in an embodiment the data from memory mapped input/output may arrive while the event is being handled. In combination with any of the above embodiments, in an embodiment the instructions may cause the processor to retire the non-posted load instruction in response to the restart. In combination with any of the above embodiments, in an embodiment the instructions may cause the processor to, based on the determination that the event arrived, determine whether the event has been serviced, restart the timer based on the determination that the event has been serviced, and release the entry allocated in the data return buffer and associated with the instruction based on the determination that the event has been serviced. In combination with any of the above embodiments, in an embodiment the data return buffer may be a data fill buffer and the instructions may cause the processor to lock the entry allocated in the data fill buffer based on the determination that the timer exceeds the timeout threshold. In combination with any of the above embodiments, in an embodiment the instructions may cause the processor to receive a signal associated with a timeout of the non-posted load instruction to load data from memory mapped input/output and retire the non-posted load instruction with an error associated with the signaled timeout.

What is claimed is:

1. A processor, comprising:
    a decoder to decode an instruction for a non-posted load into a decoded instruction, the instruction to load data from memory mapped input/output;
    a data return buffer;
    an execution unit for executing the decoded instruction;
    a memory execution unit to:
        start a timer, wherein the timer is to measure an amount of time taken to retire the non-posted load instruction;
        determine that the timer exceeds a timeout threshold;
        allocate an entry in the data return buffer to maintain data from execution of the non-posted load instruction based on the determination that the timer exceed the timeout threshold; and
    an event handler to:
        determine whether an event arrived, the determination made in response to one or both of:
            the allocation of the entry in the data return buffer associated with the non-posted load instruction; and
            the determination that the timer exceeds the timeout threshold; and
        handle the event in parallel with execution of the posted load instruction, wherein the entry in the data return buffer is used while the posted load instruction is executed in parallel with handling of the event.

2. The processor of claim 1, wherein the memory execution unit is further to:

based on the determination that the event arrived, determine whether the event has been serviced; and
receive the data from memory mapped input/output; and
the processor further comprising:
  a retirement unit to retire the non-posted load instruction after a determination that the event has been serviced and the data from memory mapped input/output has been received.
3. The processor of claim 2, wherein the memory execution unit is further to:
  based on the determination that the event arrived, determine whether the event has been serviced;
  restart the timer, in response to the determination that the event has been serviced; and
  redirect the non-posted load instruction to use the entry in the data return buffer.
4. The processor of claim 1, wherein:
  the timer is a counter; and
  the memory execution unit is further to:
    initialize the counter to the timeout threshold; and
    decrement the counter, wherein the determination that the timer exceeds the timeout threshold corresponds to the decremented counter reaching zero.
5. The processor of claim 1, wherein the memory execution unit is further to:
  based on the determination that the event arrived, determine whether the event has been serviced;
  restart the timer, in response to the determination that the event has been serviced; and
  release the entry allocated in the data return buffer associated with the non-posted load instruction, in response to the determination that the event has been serviced.
6. The processor of claim 1, wherein:
  the data return buffer is a data fill buffer; and
  the memory execution unit is further to:
    lock the entry allocated in the data fill buffer based on the determination that the timer exceeds the timeout threshold.
7. The processor of claim 1, further comprising:
  a system agent to signal a timeout associated with the non-posted load instruction; and
  a retirement unit to retire the non-posted load instruction with an error associated with the signaled timeout.
8. A method, comprising:
  decoding an instruction for a non-posted load, the instruction to load data from memory mapped input/output;
  starting a timer, the timer for measuring an amount of time taken to retire the non-posted load instruction;
  determining that the timer exceeds a timeout threshold;
  allocating an entry in a data return buffer to maintain data from execution of the non-posted load instruction based on the determination that the timer exceed the timeout threshold;
  determining whether an event arrived based on at least one of:
    the allocation of the entry associated with the non-posted load instruction; and
    the determination that the timer exceeds the timeout threshold; and
  handling the event in parallel with execution of the posted load instruction, wherein the entry in the data return buffer is used while the posted load instruction is executed in parallel with handling of the event.
9. The method of claim 8, further comprising:
  based on determining that the event arrived, determining whether the event has been serviced;
  receiving the data from memory mapped input/output; and
  retiring the non-posted load instruction after determining that the event has been serviced and the data from memory mapped input/output has been received.
10. The method of claim 9, further comprising:
  based on determining that the event arrived, determining whether the event has been serviced;
  restarting the timer in response to determining that the event has been serviced; and
  redirecting the non-posted load instruction to use the entry in the data return buffer.
11. The method of claim 8, wherein:
  the timer is a counter;
the method further comprising:
  initializing a counter to the timeout threshold; and
  decrementing the counter, wherein the determination that the timer exceeds the timeout threshold corresponds to the decremented counter reaching zero.
12. The method of claim 8, further comprising:
  based on determining that the event arrived, determining whether the event has been serviced;
  restarting the timer based on determining that the event has been serviced; and
  releasing the entry allocated in the data return buffer and associated with the instruction based on determining that the event has been serviced.
13. The method of claim 8, wherein:
  the data return buffer is a data fill buffer; and
the method further comprising:
  locking the entry allocated in the data fill buffer based on the determination that the timer exceeds the timeout threshold.
14. A memory execution unit, the memory execution unit is to:
  start a timer in association with execution of a non-posted load instruction, the timer is to measure an amount of time taken to retire an operation for the non-posted load, the operation to load data from memory mapped input/output;
  determine whether the timer exceeds a timeout threshold;
  allocate an entry in the data return buffer to maintain data from execution of the non-posted load instruction based on the determination that the timer exceed the timeout threshold, wherein the entry is to be accessed while the non-posted load instruction is executed in parallel with servicing of an event received following a start of the execution of the non-posted load instruction, wherein the event is serviced and the non-posted load instruction is executed on the same processor.
15. The memory execution unit of claim 14, is further to:
  based on the determination that the event arrived, determine whether the event has been serviced;
  receive the data from memory mapped input/output; and
  buffer the received data for a retirement of the non-posted load instruction after a determination that the event has been serviced and the data from memory mapped input/output has been received.
16. The memory execution unit of claim 15, is further to:
  based on the determination that the event arrived, determine whether the event has been serviced;
  restart the timer, in response to the determination that the event has been serviced; and
  redirect the non-posted load instruction to use the entry in the data return buffer.

17. The memory execution unit of claim 16, wherein the data return buffer serves as a write back buffer for the non-posted load instruction after the non-posted load instruction is redirected.

18. The memory execution unit of claim 14, wherein:
the timer is a counter; and
the memory execution unit is further to:
   initialize the counter to the timeout threshold; and
   decrement the counter, wherein the determination that the timer exceeds the timeout threshold corresponds to the decremented counter reaching zero.

19. The memory execution unit of claim 14, is further to:
based on the determination that the event arrived, determine whether the event has been serviced;
restart the timer, in response to the determination that the event has been serviced; and
release the entry allocated in the data return buffer associated with the non-posted load instruction, in response to the determination that the event has been serviced.

20. The memory execution unit of claim 14, wherein:
the data return buffer is a data fill buffer; and
the memory execution unit is further to:
   lock the entry allocated in the data fill buffer based on the determination that the timer exceeds the timeout threshold.

* * * * *